US008069158B2

(12) United States Patent
Kii et al.

(10) Patent No.: US 8,069,158 B2
(45) Date of Patent: Nov. 29, 2011

(54) RECEIVING APPARATUS, RECEIVING METHOD, RECEIVING PROGRAM, RECORDING MEDIUM, AND RECEIVING SYSTEM

(75) Inventors: Manabu Kii, Tokyo (JP); Takashi Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 10/940,819

(22) Filed: Sep. 15, 2004

(65) Prior Publication Data

US 2005/0075901 A1    Apr. 7, 2005

(30) Foreign Application Priority Data

Oct. 1, 2003   (JP) .................................. 2003-343672

(51) Int. Cl.
*G06F 7/00* (2006.01)
(52) U.S. Cl. ........ 707/705; 707/783; 707/803; 709/219; 709/223; 360/1; 360/18; 360/27; 369/13.56
(58) Field of Classification Search .................. 705/1
See application file for complete search history.

(56) References Cited

U.S. PATENT DOCUMENTS

| | | | | |
|---|---|---|---|---|
| 6,324,659 | B1 * | 11/2001 | Pierro | 714/48 |
| 6,449,226 | B1 * | 9/2002 | Kumagai | 369/47.1 |
| 6,529,946 | B2 * | 3/2003 | Yokono et al. | 709/217 |
| 2001/0056404 | A1 * | 12/2001 | Kuriya et al. | 705/51 |
| 2002/0023198 | A1 * | 2/2002 | Kokubun et al. | 711/162 |
| 2002/0143907 | A1 * | 10/2002 | Tsurubayashi | 709/221 |
| 2002/0147979 | A1 * | 10/2002 | Corson | 725/90 |
| 2003/0147330 | A1 | 8/2003 | Teraoka et al. | |
| 2004/0078338 | A1 * | 4/2004 | Ohta et al. | 705/51 |
| 2006/0212564 | A1 * | 9/2006 | Morohashi | 709/223 |

FOREIGN PATENT DOCUMENTS

| | | | |
|---|---|---|---|
| EP | 1 037 460 | A2 | 9/2000 |
| EP | 1037460 | A2 * | 9/2000 |
| EP | 1 215 674 | A2 | 6/2002 |
| EP | 1215674 | A2 * | 6/2002 |

(Continued)

OTHER PUBLICATIONS

Yasuakl Maeda, "MiniDisc System", TUPM 7.5, Consumer Electronics, 1993. Digest of Technical Papers. ICCE., XP-010107147, Jun. 8, 1993, pp. 124-125.

(Continued)

*Primary Examiner* — Tim T Vo
*Assistant Examiner* — Hasanul Mobin
(74) *Attorney, Agent, or Firm* — Oblon, Spivak, McClelland, Maier & Neustadt, L.L.P.

(57) ABSTRACT

After a reception start request of contents is issued, the presence or absence of a PD connected to a PC is discriminated. If no PD exists, the received contents is recorded into only the PC. If the PD exists, a media type of PD is discriminated. If it is a built-in type, the received contents is recorded into the PC, also transferred to the PD, and recorded into a storing medium in the PD. If it is a media type, whether or not the storing medium has been loaded into the PD is discriminated. If it has been loaded, the received contents is recorded into the PC, also transferred to the PD, and recorded into the storing medium in the PD. If it is not loaded, the user is urged to load the storing medium. Since the recording of the received contents into the PC and the recording into the PD are automatically executed, there is no need to individually execute those processes.

19 Claims, 12 Drawing Sheets

FOREIGN PATENT DOCUMENTS

| | | |
|---|---|---|
| EP | 1 237 368 A2 | 9/2002 |
| JP | 8-251320 | 9/1996 |
| JP | 2000-163865 | 6/2000 |
| JP | 2001-93226 | 4/2001 |
| JP | 2001-202086 | 7/2001 |
| JP | 2002-175665 | 6/2002 |
| JP | 2003-85893 | 3/2003 |

OTHER PUBLICATIONS

Patent Abstracts of Japan, JP 2003-100018, Apr. 4, 2003.
Patent Abstracts of Japan, JP 2002-237059, Aug. 23, 2002.

* cited by examiner

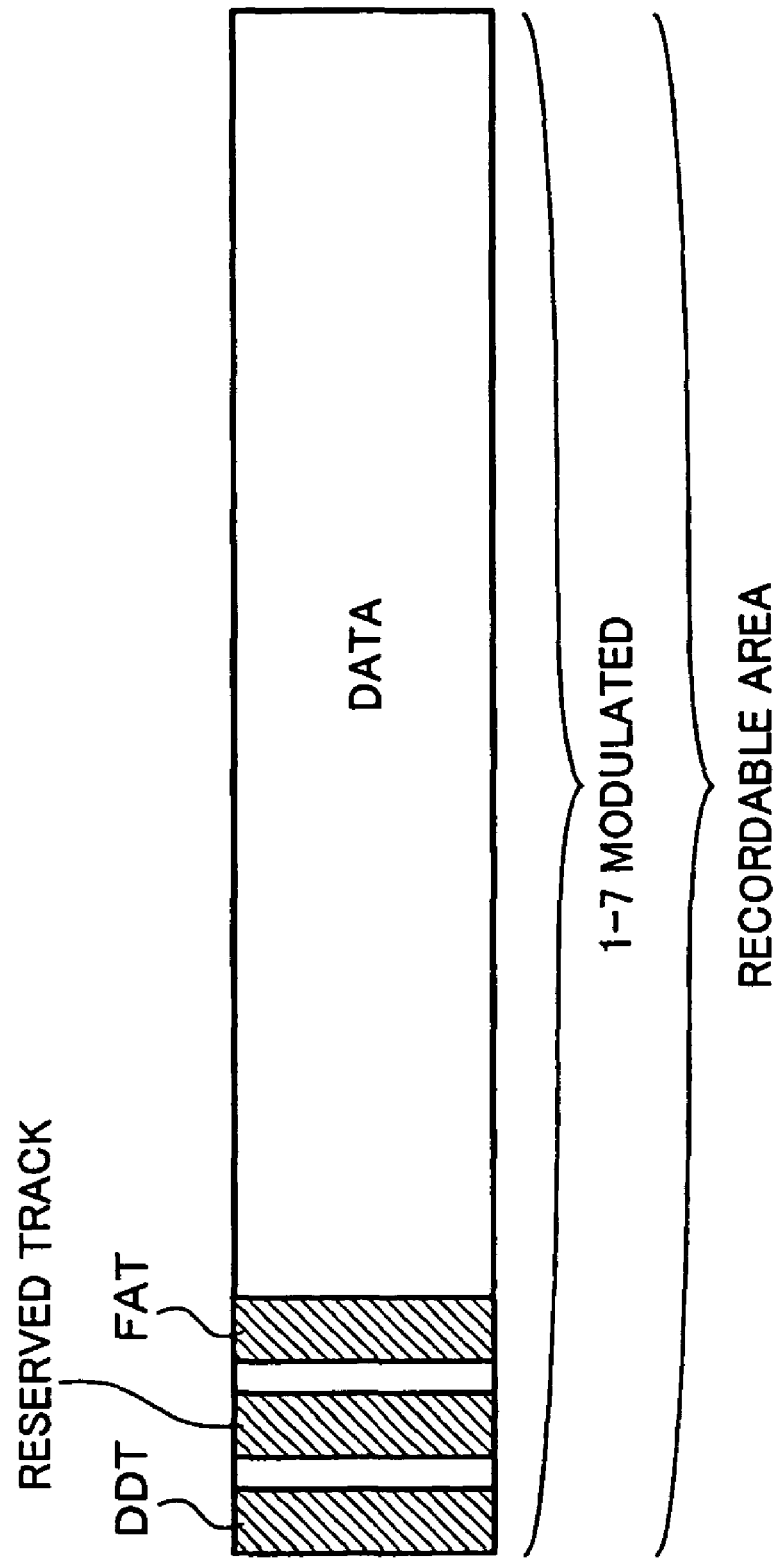

RECEIVING APPARATUS, RECEIVING METHOD, RECEIVING PROGRAM, RECORDING MEDIUM, AND RECEIVING SYSTEM

BACKGROUND OF THE INVENTION

1. Field of the Invention

The invention relates to a receiving apparatus, a receiving method, a receiving program, a recording medium, and a receiving system for receiving contents distributed through a network, recording it, and further transferring the received contents to another recording apparatus.

2. Description of the Related Arts

In recent years, a network environment such as Internet or the like has been developed and, generally, contents data such as music data or the like is distributed through the network. The contents distributed from a distributing server on the network is received (downloaded) by an information apparatus such as a personal computer connected to the network and stored into a storing apparatus such as a hard disk drive or the like. If copyright management information such as the number of copy permission times and the like has been added to the contents, those information is also stored into a storing medium.

The contents which has been downloaded and stored in the storing medium of the personal computer can be transferred to another recording and reproducing apparatus. When the contents is the music data, the downloaded contents is transferred to, for example, a portable recording and reproducing apparatus having a small hard disk drive therein. In recent years, there has been also proposed an MD system of the next generation in which a disc of the same size as that of the conventional MD (Mini Disc) is used, a larger capacity is realized, the recording of music data is executed under management of an FAT file system, and an affinity with the personal computer or the like is more enhanced. The downloaded contents is transferred from the personal computer into the portable recording and reproducing apparatus corresponding to such an MD system of the new generation and recorded onto the disc.

By transferring the downloaded contents to the portable recording and reproducing apparatus and recording onto the recording medium as mentioned above, the user can reproduce and enjoy the contents even in the open air. A construction in which contents data downloaded from a contents server into a data transfer apparatus such as a personal computer or the like through a network is transferred to a recording and reproducing apparatus using a semiconductor memory or an MD as a recording medium and recorded onto the recording medium has been disclosed in JP-A-2002-175664.

In order to enable the contents distributed through the network to be reproduced by an apparatus (for example, recording and reproducing apparatus: which is referred to as an apparatus B) other than an apparatus in which the contents has been downloaded (for example, personal computer: which is referred to as an apparatus A), hitherto, there is such a problem that after the contents was downloaded by the apparatus A, the user needs to execute the operation for transferring the contents from the apparatus A to the apparatus B, so that it is troublesome.

Particularly, there are many cases where the user possesses a plurality of apparatuses B to which the downloaded contents should be transferred. In such a case, there is such a problem that it takes the operation and a time corresponding to the number of possessed apparatuses B and the troublesomeness is enhanced.

When the downloaded contents has the copyright management information, there is a case where the contents is stored into a storing medium such as a hard disk drive or the like of, for example, a personal computer in which the contents has been downloaded and the copyright management information to the contents data is stored in a designated memory location on the hard disk drive. When the contents is transferred to another apparatus B, the user needs to designate the contents stored in the hard disk drive and the corresponding copyright management information. There is such a problem that when the downloaded contents data is stored into the hard disk drive, unless the user consciously designates the storing locations of those data, it is difficult to search for the target contents and the corresponding copyright management information, so that there is a fear that the contents data cannot be transferred. Such operations are particularly difficult for the user who is not proficient in the operation of the personal computer.

OBJECTS AND SUMMARY OF THE INVENTION

It is, therefore, an object of the invention to provide a receiving apparatus, a receiving method, a receiving program, a recording medium, and a receiving system which can easily execute processes for downloading contents and transferring to another apparatus.

According to the invention, to solve the above problems, there is provided a receiving apparatus for downloading contents from a server through a network, comprising: communicating means for communicating with the server through the network; storing means for storing data; and connecting means to which a recording apparatus can be connected, wherein when the contents is downloaded from the server by the communicating means, whether or not the recording apparatus has been connected to the connecting means is discriminated and, if it is determined that the recording apparatus has been connected, the downloaded contents is stored into the storing means and recorded into the recording apparatus.

According to the invention, there is provided a receiving method of downloading contents from a server through a network, comprising the steps of: when the contents is downloaded from the server, discriminating whether or not a recording apparatus has been connected to connecting means; and if it is determined that the recording apparatus has been connected, storing the downloaded contents into storing means and recording it into the recording apparatus.

According to the invention, there is provided a receiving program for allowing a computer apparatus to execute a receiving method of downloading contents from a server through a network, wherein in the receiving method, when the contents is downloaded from the server, whether or not a recording apparatus has been connected to connecting means is discriminated and, if it is determined that the recording apparatus has been connected, the downloaded contents is stored into storing means and recorded into the recording apparatus.

According to the invention, there is provided a recording medium in which a receiving program for allowing a computer apparatus to execute a receiving method of downloading contents from a server through a network has been recorded, wherein in the receiving method, when the contents is downloaded from the server, whether or not a recording apparatus has been connected to connecting means is discriminated and, if it is determined that the recording apparatus has been connected, the downloaded contents is stored into storing means and recorded into the recording apparatus.

According to the invention, there is provided a receiving system for downloading contents from a server through a network, comprising: communicating means for communicating with the server through the network; first storing means which is fixedly used; and detachable second storing means, wherein when the contents is downloaded from the server by the communicating means, whether or not the second storing means can be used is discriminated, and if it is determined that the second storing means can be used, the downloaded contents is stored into the first storing means and recorded into the second storing means.

According to the invention, there is provided a receiving method of downloading contents from a server through a network, comprising the steps of: when the contents is downloaded from the server, discriminating whether or not detachable first storing means can be used; and if it is determined that the first storing means can be used, storing the downloaded contents into second storing means which is fixedly used and recording it into the first storing means.

According to the invention, there is provided a receiving program for allowing a computer apparatus to execute a receiving method of downloading contents from a server through a network, wherein in the receiving method, when the contents is downloaded from the server, whether or not detachable first storing means can be used is discriminated, and if it is determined that the first storing means can be used, the downloaded contents is stored into second storing means which is fixedly used and recorded into the first storing means.

According to the invention, there is provided a recording medium in which a receiving program for allowing a computer apparatus to execute a receiving method of downloading contents from a server through a network has been recorded, wherein in the receiving method, when the contents is downloaded from the server, whether or not detachable first storing means can be used is discriminated, and if it is determined that the first storing means can be used, the downloaded contents is stored into second storing means which is fixedly used and recorded into the first storing means.

As mentioned above, according to the invention, when the contents is downloaded from the server, whether or not the recording apparatus has been connected to the connecting means is discriminated and, if it is determined that the recording apparatus has been connected, the downloaded contents is stored into the storing means and recorded into the recording apparatus. Therefore, the contents can be downloaded and stored into the storing means and the downloaded contents can be also automatically recorded into the connected recording apparatus.

According to the invention, in the receiving method, when the contents is downloaded from the server, whether or not the detachable storing means can be used is discriminated and, if it is determined that the detachable storing means can be used, the downloaded contents is stored into the storing means which is fixedly used and recorded into the detachable storing means. Therefore, the contents can be downloaded and stored into the storing means which is fixedly used and the downloaded contents can be also automatically recorded into the detachable storing means in the state where it can be used.

According to the present invention, when a contents distributing service is received, whether or not the recording apparatus (apparatus B) has been connected is discriminated in the information apparatus (apparatus A), and if the recording apparatus has been connected, the downloaded contents is recorded into the storing medium of the apparatus A and transferred and recorded into the connected apparatus B. Therefore, there is such an effect that the operation for transferring the contents from the apparatus A in which the contents has been downloaded to another apparatus B from which it is intended to reproduce the contents and recording it does not need to be additionally executed after the contents distributing service was received.

According to a modification of an embodiment of the invention, a plurality of apparatuses B can be connected to the apparatus A, the downloaded contents is recorded into the recording medium of the apparatus A and transferred and recorded to the plurality of apparatuses B connected to the apparatus A, respectively. Therefore, there is such an effect that the operation for transferring and recording the contents to the plurality of apparatuses B does not need to be additionally executed after the contents distributing service was received but can be finished by one operation.

The above and other objects and features of the present invention will become apparent from the following detailed description and the appended claims with reference to the accompanying drawings.

BRIEF DESCRIPTION OF THE DRAWINGS

FIG. 10 is a diagram for use in explanation of a recording area of the disc of the specifications of the MD2 system of the next generation;

DETAILED DESCRIPTION OF THE PREFERRED EMBODIMENTS

Figure 1:
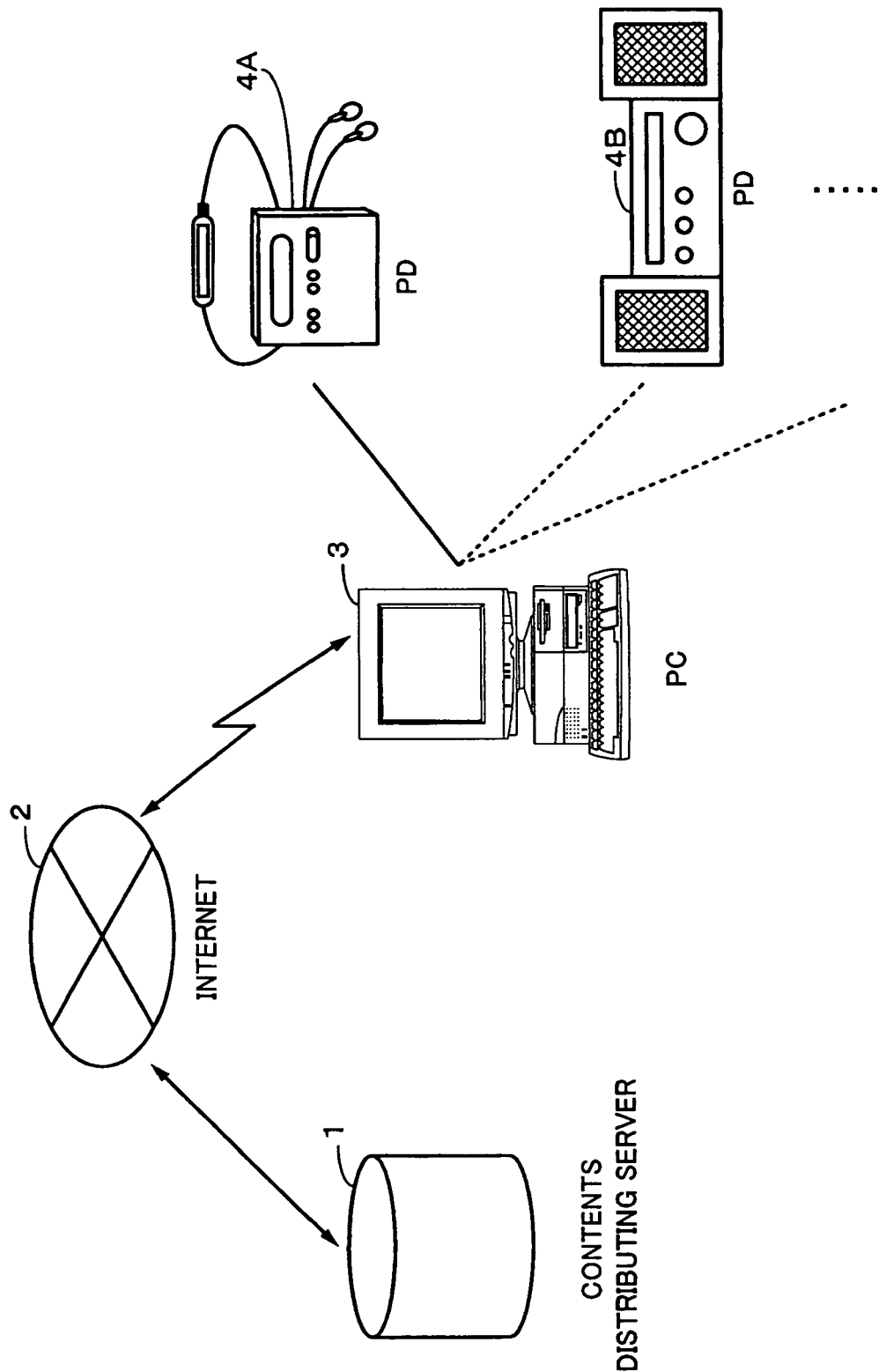
FIG. 1 is a schematic diagram showing a construction of an example of a contents distributing system to which the invention is applied.

An embodiment of the invention will be described hereinbelow with reference to the drawings. FIG. 1 shows a construction of an example of a contents distributing system to which the invention is applied. A contents distributing server 1 in which a number of contents which can be distributed have been accumulated is connected to a network 2 such as Internet or the like. An information apparatus 3 such as a personal computer (PC) or the like possessed by the user is further connected to the network 2.

The contents distributing server 1 transmits requested contents in accordance with a contents distributing request made by the user through the network 2 from the information apparatus 3. The transmitted contents is received by the information apparatus 3 through the network 2. The information apparatus 3 has a storing medium such as hard disk drive, semiconductor memory, or the like and stores the received contents into the storing medium.

The contents which is distributed from the contents distributing server 1 will be described as music data hereinbelow. The music data is shown here as an example and the contents which is distributed from the contents distributing server 1 are not limited to the music data but can be any other data.

A recording and reproducing apparatus 4 (in FIG. 1, it is shown as a portable device PD) for recording and reproducing the contents can be connected to the information apparatus 3. The recording and reproducing apparatus 4 records the contents into a storing medium such as magnetooptic disc, optical disc, built-in hard disk drive, or semiconductor memory and reproduces the contents stored in the storing medium. For example, a USB (Universal Serial Bus) can be used as an interface for connecting the information apparatus 3 to the recording and reproducing apparatus 4. The recording and reproducing apparatus 4 can receive a command from the connected information apparatus 3 and record data (contents) transferred from the information apparatus 3 into the storing medium.

As a recording and reproducing apparatus 4, there is a recording and reproducing apparatus 4A constructed as a portable small type or a recording and reproducing apparatus 4B constructed as a desk-top type. As shown in an example in FIG. 1, a plurality of recording and reproducing apparatuses such as recording and reproducing apparatuses 4A, 4B, . . . can be also simultaneously connected to one information apparatus 3.

When the information apparatus 3 downloads the contents from the contents distributing server 1 through the network 2, the downloaded contents is stored into the storing medium of the information apparatus 3 and, if the recording and reproducing apparatus 4 is connected to the information apparatus 3, the information apparatus 3 transfers the contents also to the recording and reproducing apparatus 4 and instructs the recording and reproducing apparatus 4 so that the contents is recorded into the storing medium possessed by the recording and reproducing apparatus 4. If a plurality of recording and reproducing apparatuses 4A, 4B, . . . are connected to the information apparatus 3, the contents are respectively transferred to each of the plurality of connected recording and reproducing apparatuses 4A, 4B, . . . and the transferred contents is recorded into storing media possessed by the recording and reproducing apparatuses of the transfer destination side.

When the contents is downloaded from the contents distributing server 1, merely by previously connecting the recording and reproducing apparatuses 4A, 4B, . . . into which he wants to record the downloaded contents to the information apparatus 3, the user can automatically execute the downloading of the contents and the transfer and recording of the downloaded contents to the recording and reproducing apparatuses 4A, 4B, . . . .

Figure 2:
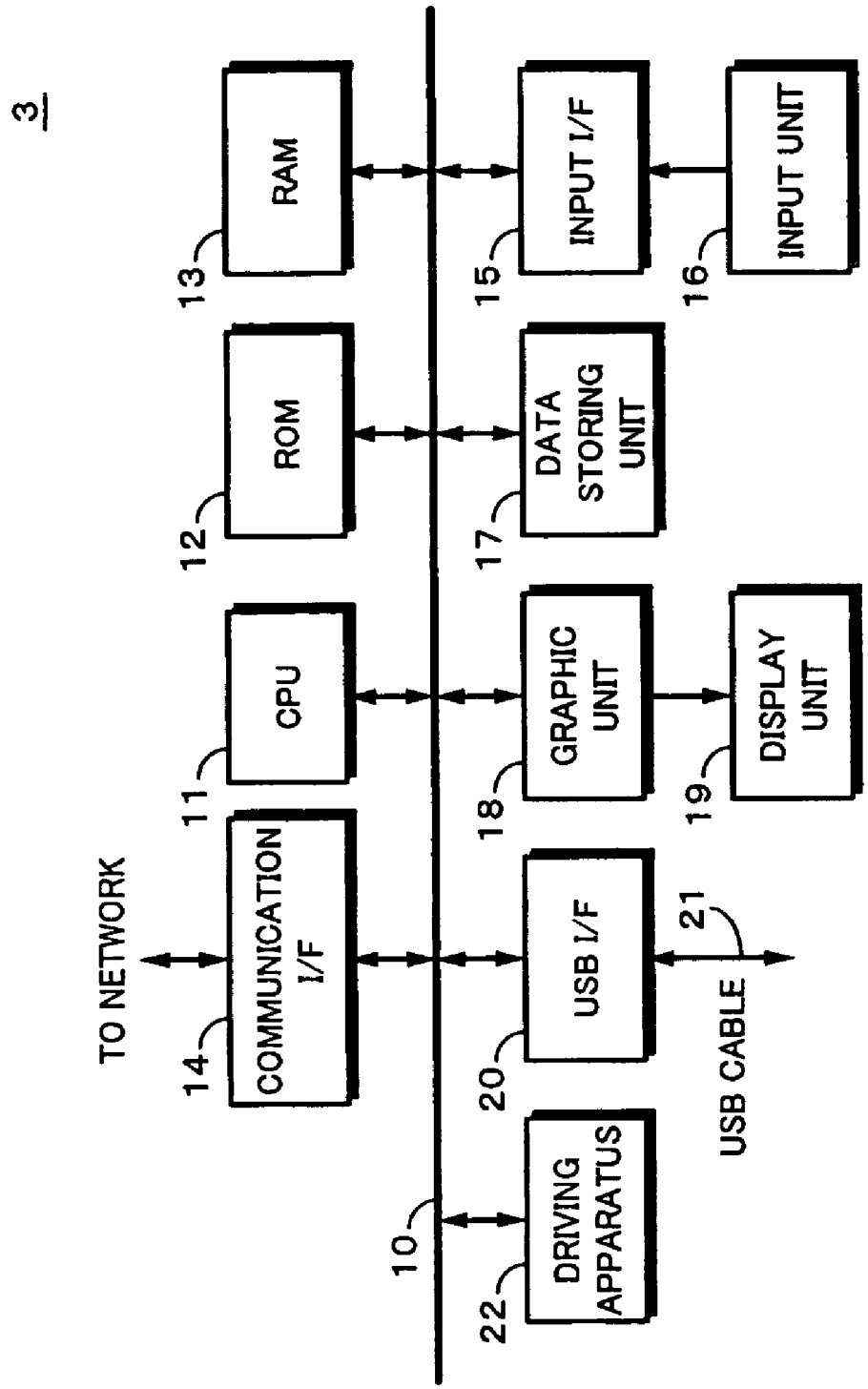
FIG. 2 is a block diagram showing a construction of an example of an information apparatus.

FIG. 2 shows a construction of an example of the information apparatus 3. As mentioned above, the information apparatus 3 is, for example, a personal computer. A CPU (Central Processing Unit) 11, a ROM (Read Only Memory) 12, a RAM (Random Access Memory) 13, a communication I/F 14, an input I/F 15, a data storing unit 17, a graphic unit 18, a USB I/F 20, and a driving apparatus 22 are connected to a bus 10.

A program necessary for activating the CPU 11 and the like are preliminarily stored in the ROM 12. The RAM 13 is used as a work memory of the CPU 11. The data storing unit 17 is a storing medium which is fixedly used in the information apparatus 3. The data storing unit 17 is, for example, a hard disk drive in which a program necessary for the operation of the CPU 11 has preliminarily been stored and the data is stored. The CPU 11 operates in accordance with the program stored in the data storing unit 17 while using the RAM 13 as a work memory and controls each unit of the information apparatus 3.

An input unit 16 such as pointing device like a mouse or the like or keyboard is connected to the input I/F 15. A control signal according to an input to the input unit 16 is sent to the CPU 11 through the input I/F 15. A display unit 19 such as CRT (Cathode Ray Tube), LCD (Liquid Crystal Display), or the like is connected to the graphic unit 18. A display control signal formed by the CPU 11 so as to perform a predetermined display is supplied to the graphic unit 18, converted into a signal which can be displayed on the display unit 19, and supplied to the display unit 19. The predetermined display is performed by the display unit 19.

The communication I/F 14 communicates with the network 2 by using a predetermined protocol on the basis of a command of the CPU 11 and controls the communication of the information apparatus 3 with the network 2. The USB I/F 20 controls communication with an external apparatus connected through a USB cable 21. The USB I/F 20 can connect a plurality of external apparatuses by using, for example, a USB hub.

The driving apparatus 22 records data to a CD-R (Compact Disc-Recordable) or a CD-RW (Compact Disc-ReWritable). The driving apparatus 22 reproduces the data recorded in the CD-R, the CD-RW, and a CD-ROM. The driving apparatus 22 is not limited to such an example but the data can be also recorded onto a recordable disc among DVDs (Digital Versatile Discs). The driving apparatus 22 is not limited to it but, for example, it is also possible to insert a semiconductor memory into a slot or the like and record and reproduce data into/from the semiconductor memory.

Although the invention has been described on the assumption that the information apparatus 3 is the personal computer, it is not limited to such an example. For example, the information apparatus 3 can be another information apparatus having a communicating function for communicating with the network 2 and a communicating function by the USB. For example, a home video game machine can be applied as an information apparatus 3. In this case, a semiconductor memory can be used as a data storing unit 17. An apparatus only for downloading the contents from the contents distributing server 1 can be constructed in a manner similar to FIG. 2.

Figure 3:
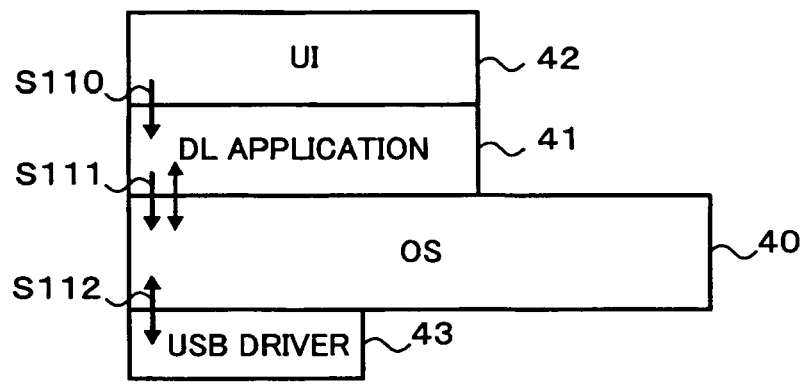
FIG. 3 is a diagram schematically showing a software construction of the information apparatus.

FIG. 3 schematically shows a software construction of the information apparatus 3. A download (DL) application 41 is an upper application of an OS (Operating System) 40 and controls the downloading of the contents from the contents distributing server 1. The DL application 41 also outputs a command for requesting the writing of the data into the storing medium in the recording and reproducing apparatus 4, deletion of the data recorded in the storing medium, or the like to the recording and reproducing apparatus 4 connected through the USB I/F 20. A UI (User Interface) 42 is an upper application of the DL application 41 and performs an interface with the user such as display to the display unit 19, reception of the input which is executed through the input I/F 15 from the input unit 16, or the like. A USB driver 43 is a lower application of the OS 40 and controls the USB I/F 20 as hardware and USB devices connected to the USB I/F 20.

The DL application 41 and the UI 42 are provided as programs recorded on a recording medium such as a CD-ROM (Compact Disc-Read Only Memory) or the like. In the information apparatus 3, the CD-ROM is loaded into the CD-R drive 22 and a program for executing the DL application 41 and the UI 42 recorded on the CD-ROM is installed into the data storing unit 17 of the information apparatus 3. The program installed in the data storing unit 17 is executed by the CPU 11. The program for executing the DL application 41 and the UI 42 is not always necessary to be recorded on the CD-ROM and provided but can be provided in the state where the program has previously been installed in the data storing unit 17 of the information apparatus 3 or can be downloaded from a predetermined server through the network 2 and installed into the information apparatus 3.

Figure 4:
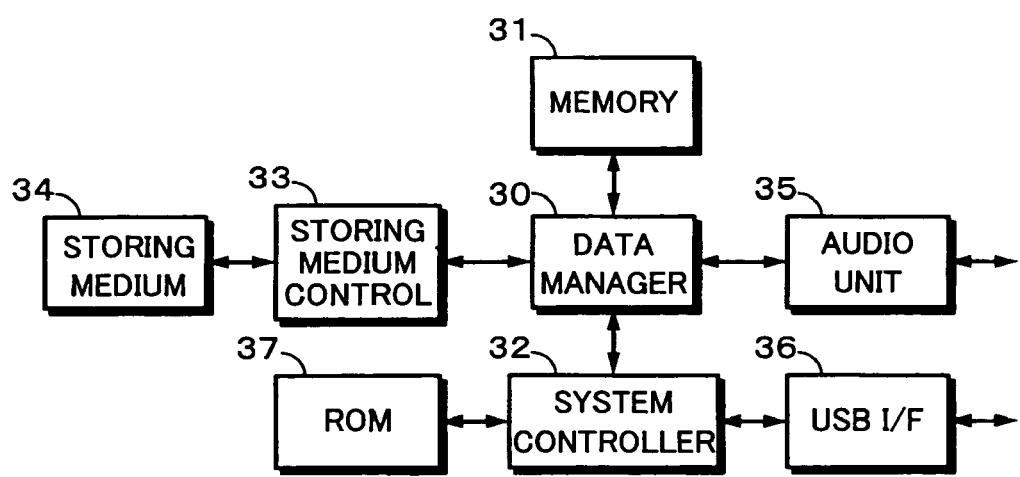
FIG. 4 is a block diagram showing a construction of an example of a recording and reproducing apparatus.

FIG. 4 shows a construction of an example of the recording and reproducing apparatus 4. The recording and reproducing apparatus 4 records and reproduces the audio data as contents. A system controller 32 has, for example, a CPU, a ROM, and a RAM as a work memory of the CPU and controls the whole recording and reproducing apparatus 4 on the basis of a program which has previously been stored in the ROM. Property information of the recording and reproducing apparatus 4 is previously recorded in a ROM 37 connected to the system controller 32.

A data manager 30 controls a storing medium control unit 33 on the basis of a command from the system controller 32. The data manager 30 executes decoding of a compression code and an error correction code of the audio data read out from a storing medium 34, compression encoding and error correction encoding of the audio data which is stored in the storing medium 34, and the like by using a memory 31. The memory 31 is also used as a buffer of the data which is recorded into the storing medium 34 and the data read out from the storing medium 34.

The storing medium control unit 33 executes error correction encoding and recording encoding of the data which is written into the storing medium 34 and decoding of the error correction code and recording code of the data read out from the storing medium 34. The storing medium control unit 33 controls the recording and reproduction of the data to/from the storing medium 34.

An audio unit 35 comprises, for example, an A/D converter, a D/A converter, a sound quality adjusting unit, and an amplifier and executes: a process for converting a digital audio signal into an analog audio signal; a process for converting the analog audio signal into the digital audio signal; a sound quality adjusting process; an amplifying process for enabling the analog audio signal to be reproduced by headphones or speakers; and the like.

Upon recording, for example, the analog audio signal inputted to the audio unit 35 is converted into the digital audio signal by the A/D converter and the digital audio signal is supplied to the data manager 30. The data manager 30 executes the compression encoding and the error correction encoding to the supplied audio data by using the memory 31 and supplies the encoded audio data to the storing medium control unit 33. The storing medium control unit 33 records the supplied audio data onto the storing medium 34 under the control of the data manager 30.

Upon reproduction, the audio data read out from the storing medium 34 is supplied to the data manager 30 under the control of the storing medium control unit 33 and decoding of the error correction code and decoding of the compression code are executed by using the memory 31. The digital audio signal outputted from the data manager 30 is supplied to the audio unit 35 and the D/A converting process and the sound quality adjusting process are executed to the digital audio signal. The D/A converted analog audio signal is amplified by the amplifier and supplied to the headphones or speakers (not shown).

A USB I/F 36 is connected to the system controller 32, thereby enabling communication by the USB to be made between the recording and reproducing apparatus 4 and an external apparatus. When the recording and reproducing apparatus 4 is connected to the information apparatus 3 through the USB I/F 36, it is controlled so as to operate as a slave apparatus for the information apparatus 3. For example, the recording and reproducing apparatus 4 connected to the information apparatus 3 through the USB I/F 36 is controlled by a command which is supplied from the information apparatus 3.

The storing medium 34 is mainly classified into two types: a built-in type in which it is built in the recording and reproducing apparatus 4; and a media type in which it is detachable and loaded into the recording and reproducing apparatus 4 and used. As a built-in type storing medium 34, for example, a hard disk drive or a semiconductor memory can be used. As a media type, for example, a magnetooptic disk, a recordable optical disk, or a detachable semiconductor memory can be used. Information showing to which one of the built-in type and the media type the recording and reproducing apparatus 4 corresponds as a storing medium 34 is preliminarily stored as property information into, for example, the ROM 37.

A construction of the recording and reproducing apparatus 4 shown in FIG. 4 is a typical example and it is not limited to this example.

Figure 5:
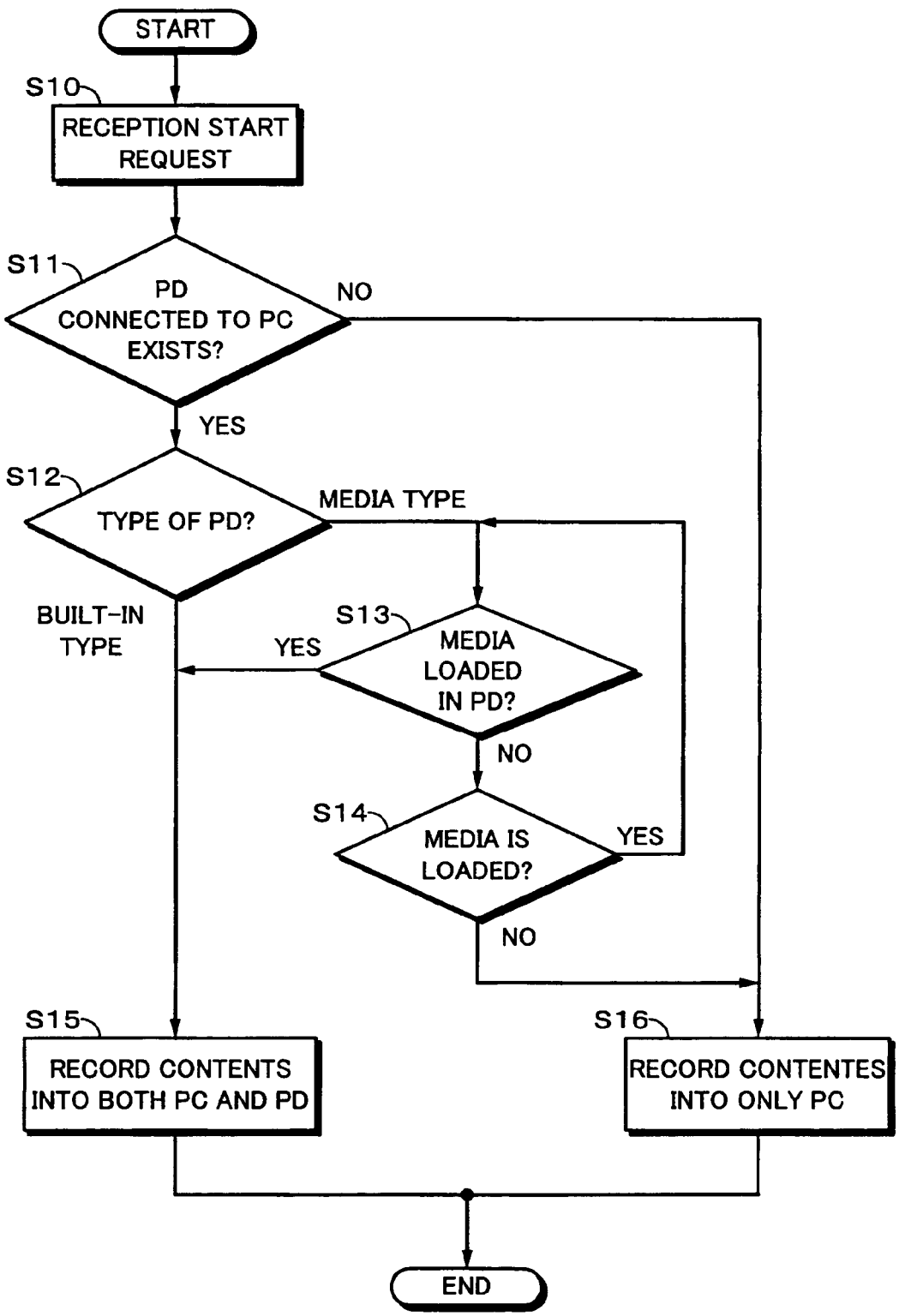
FIG. 5 is a flowchart showing processes in an example upon downloading contents according to an embodiment of the invention.

FIG. 5 is a flowchart showing processes in an example upon downloading the contents according to an embodiment of the invention. The processes according to this flowchart are executed in the information apparatus 3. In FIG. 4, the information apparatus 3 is described as "PC" and the recording and reproducing apparatus 4 is described as "PD".

First, the DL application 41 is activated in the information apparatus 3 prior to the processes of this flowchart. When the process for connecting the information apparatus 3 to the contents distributing server 1 is started, the UI 42 is activated by the DL application 41 and a predetermined display screen (for example, contents purchasing display screen) is displayed to the display unit 19. When the connection to the contents distributing server 1 is established, for example, a list of contents which can be downloaded is transmitted from the contents distributing server 1. On the basis of this list, contents of the list are displayed to the contents purchasing display screen in the information apparatus 3 by the UI 42. The user selects the contents which he wants to download on the basis of the list display.

When an instruction to download the selected contents is inputted by the user, a reception start request of the contents is transmitted from the information apparatus 3 to the contents distributing server 1 in step S10. In next step S11, whether or not the recording and reproducing apparatus 4 connected to the information apparatus 3 at present through the USB I/F 20 exists is discriminated.

For example, explanation will now be made with reference to FIG. 3. When the user operates, for example, a purchase button arranged on the contents purchasing display screen and instructs the UI 42 to download the selected contents, the UI 42 notifies the DL application 41 that the downloading has been instructed (S110). In response to this notification, the DL application 41 inquires of the OS 40 whether or not some USB device has been connected to the USB I/F 20 (S111). The OS 40 always executes the polling to the USB driver 43 (S112). By returning a result of the polling in response to the inquiry from the DL application 41, the DL application 41 can know whether or not the USB device has been connected to the USB I/F 20.

If it is determined that the USB device has been connected to the USB I/F 20, whether or not the USB device is the recording and reproducing apparatus 4 is discriminated. When the USB device is connected to the USB I/F 20, the OS 40 caches a device ID of the connected USB device. A kind (category) of the connected USB device can be known by examining the cached device ID. If it is determined that the recording and reproducing apparatus 4 has been connected to the information apparatus 3, the processing routine advances to step S12.

If it is determined in step S11 that the recording and reproducing apparatus 4 is not connected to the information apparatus 3, the processing routine advances to step S16. The downloading of the contents is started in correspondence to step S10 mentioned above. In step S16, the downloaded contents is recorded into only the data storing unit 17 possessed by the information apparatus 3.

The type of storing medium 34 of the connected recording and reproducing apparatus 4 is discriminated in step S12. This discrimination is made on the basis of, for example, the property information stored in the ROM 37 of the recording and reproducing apparatus 4. That is, in the process of step S11 mentioned above, the kind (for example, storage apparatus) of the connected USB device can be known by examining the device ID defined by the standard of the USB. The type of storing medium 34 is not defined by the USB but defined by a level of the recording and reproducing apparatus 4. Therefore, a command to obtain the property information is sent from the DL application 41 to the connected recording and reproducing apparatus 4, thereby examining the type of storing medium 34 of the recording and reproducing apparatus 4.

If type of storing medium 34 is the built-in type, the processing routine advances to step S15 and the downloading of the contents is started in correspondence to step S10 mentioned above. In step S15, control is made so that the downloaded contents is recorded into the data storing unit 17 of the information apparatus 3 and also recorded into the storing medium 34 of the recording and reproducing apparatus 4 connected to the information apparatus 3.

For example, the downloaded contents is once buffered into the data storing unit 17 of the information apparatus 3. When an amount of buffered data reaches a predetermined amount or more, the buffered data is transferred to the recording and reproducing apparatus 4 through the USB I/F 20. By leaving the buffered data as it is in the data storing unit 17, the downloaded contents is recorded in the data storing unit 17. In the recording and reproducing apparatus 4, the transferred data is received by the USB I/F 36. The received data is supplied to the data manager 30 through the system controller 32. The data manager 30 executes a predetermined process while buffering the supplied data into the memory 31 and records the processed data into the storing medium 34 through the storing medium control unit 33.

The method of recording the downloaded contents into the storing medium 34 is not limited to the above example. For instance, the process for recording the downloaded contents into the data storing unit 17 and the process for transferring the data to the recording and reproducing apparatus 4 through the USB I/F 20 can be also executed in parallel.

If the storing medium 34 of the recording and reproducing apparatus 4 is the media type, the processing routine advances to step S13 and whether or not the storing medium 34 has been loaded in the recording and reproducing apparatus 4 is discriminated. This discrimination is made by, for example, a method whereby a predetermined command is sent to the recording and reproducing apparatus 4 and a response of the recording and reproducing apparatus 4 to this command is examined. If it is determined that the storing medium 34 has already been loaded into the recording and reproducing apparatus 4, the processing routine advances to step S15 and the recording of the downloaded contents into the data storing unit 17 possessed by the information apparatus 3 and into the storing medium 34 possessed by the recording and reproducing apparatus 4 is executed as mentioned above.

If it is determined in step S13 that the storing medium 34 is not loaded into the recording and reproducing apparatus 4, the processing routine advances to step S14. In step S14, for example, the UI 42 allows a dialog box to be displayed or the like, thereby urging the user to load the storing medium 34 into the recording and reproducing apparatus 4. If the user selects the loading of the storing medium 34, the apparatus waits for the loading of the storing medium 34 by a processing step (not shown) and, after that, the processing routine is returned to step S13. If the user selects a mode in which the storing medium 34 is not loaded, the processing routine advances to step S16.

As mentioned above, by the processes of steps S11 to S14, whether or not the recording and reproducing apparatus 4 which can be used for recording the contents has been connected to the information apparatus 3 is discriminated. If the recording and reproducing apparatus 4 which can be used exists, the downloaded contents data is recorded into both of the information apparatus 3 and the recording and reproducing apparatus 4 which can be used.

If the copyright management information has been added to the contents which is downloaded and limitation of the number of times or the like has been set with respect to, for example, the copy of the contents to another storing medium, it is necessary to execute a process called "check-out" when the contents is transferred to the recording and reproducing apparatus 4 from the information apparatus 3 in which the contents has been downloaded and is recorded into the storing medium 34. The check-out denotes such a process that data is copied from a certain storing medium to another storing medium and a copy number right showing the number of copy permission times of the copy source data is decreased by "1". Such a process that the data which was checked-out is deleted from a check-out destination and the copy number right of the data of the check-out source side is returned to the inherent copy number right is called "check-in".

In the embodiment of the invention, at the time of the process of step S15 mentioned above, the check-out process is also simultaneously executed. That is, when the downloaded contents is transferred to the recording and reproducing apparatus 4, the number of copy permission times of the contents recorded in the data storing unit 17 of the information apparatus 3 is automatically decreased by "1".

For example, if the number of copy permission times of the contents whose downloading was requested in step S10 is equal to 3 times, when the contents is downloaded, the number of copy permission times of the contents which is recorded in the data storing unit 17 is decreased from 3 times by "1" and set to 2 times. The number of copy permission times of the contents which is transferred from the information apparatus 3 to the recording and reproducing apparatus 4 is set to 1 time.

Figure 6:
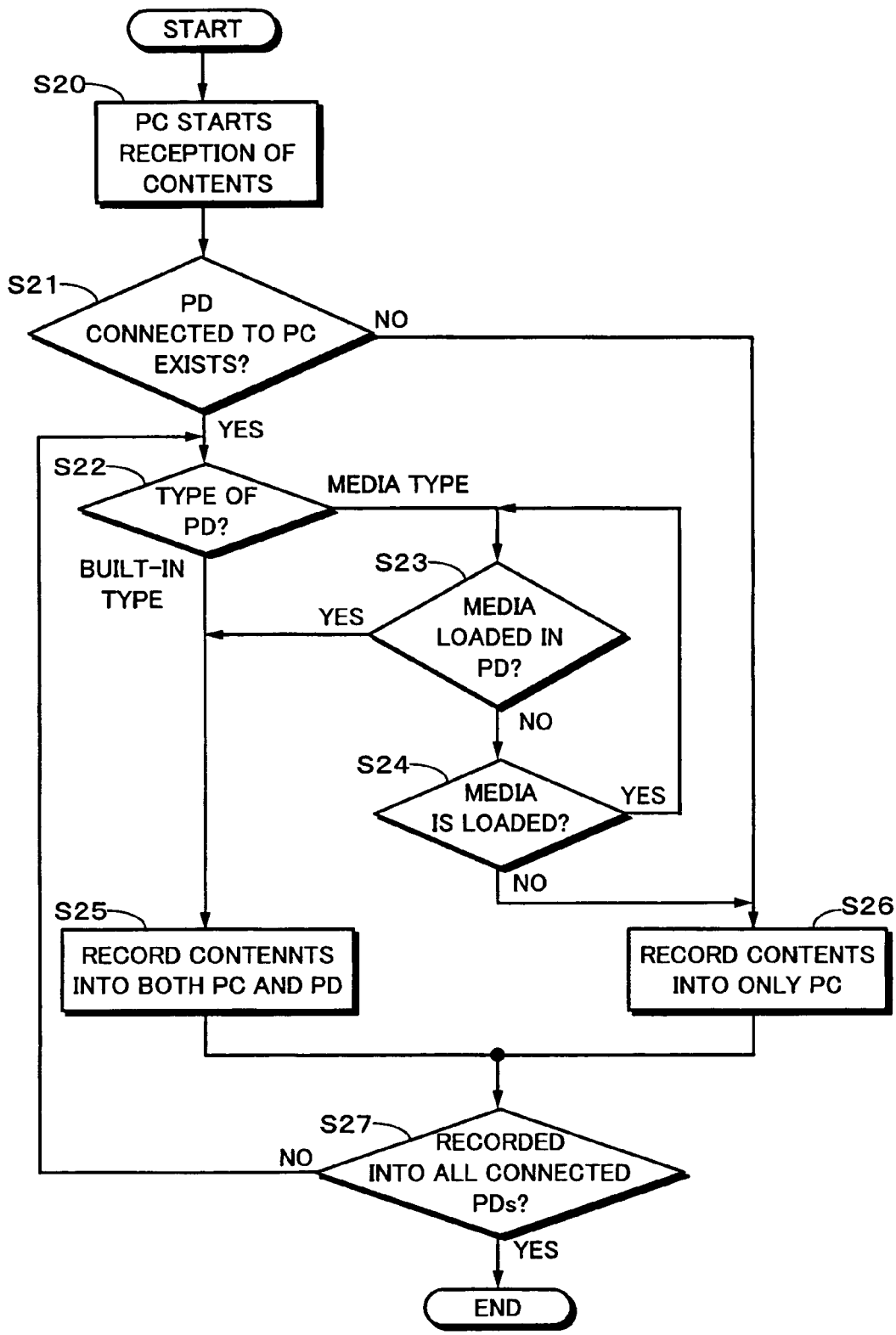
FIG. 6 is a flowchart showing processes in an example upon downloading contents in the case where a plurality of recording and reproducing apparatuses are connected according to a modification of the embodiment of the invention.

A modification of the embodiment of the invention will now be described. The above embodiment has been described with respect to the example in which one recording and reproducing apparatus 4 has been connected to the information apparatus 3. According to the modification of the embodiment, the invention can be also applied to the case where a plurality of recording and reproducing apparatuses 4A, 4B, . . . are connected to the information apparatus 3. Processes in the example in the case where a plurality of recording and reproducing apparatuses 4A, 4B, . . . have been connected will now be described with reference to FIG. 6. In the explanation of FIG. 6, a description about portions corresponding to that of the explanation of FIG. 5 mentioned above is properly omitted in order to avoid complexity.

In the information apparatus 3, the DL application 41 is activated and the process for connecting the information apparatus 3 to the contents distributing server 1 is started. On the basis of the contents purchasing display screen displayed to the display unit 19 by the UI 42, the contents to be downloaded is selected by the user. When the downloading of the contents is determined, the reception start request of the contents is transmitted from the information apparatus 3 to the contents distributing server 1 in step S20. Subsequently, in step S21, whether or not the recording and reproducing apparatuses 4 connected to the information apparatus 3 at present through the USB I/F 20 exist is discriminated. At this time, the number of connected recording and reproducing apparatuses 4 is confirmed.

As mentioned above, the DL application 41 inquires of the OS 40 whether or not some USB device has been connected to the USB I/F 20. On the basis of the device ID obtained as a result of the polling to the USB driver 43 by the OS 40, the number of connected recording and reproducing apparatuses 4 can be confirmed. If it is determined that one or more recording and reproducing apparatuses 4 have been connected to the information apparatus 3, the processing routine advances to step S22.

In step S22, the type of storing medium 34 of the connected recording and reproducing apparatus 4 is discriminated on the basis of the property information stored in the ROM 37 of the recording and reproducing apparatus 4. When a plurality of recording and reproducing apparatuses 4A, 4B, . . . are connected to the information apparatus 3, for example, processes in step S22 and subsequent steps can be executed in connecting order of the recording and reproducing apparatuses 4A, 4B, . . . to the information apparatus 3. For example, a log in which a history of the connection to the USB I/F 20 has been recorded is formed by the OS 40 and the processes in step S22 and subsequent steps can be executed in order of the history recorded in this log. The order of the processes in step S22 and subsequent steps is not limited to the connecting order. It is assumed here that the processes are executed in order of the recording and reproducing apparatuses 4A, 4B, . . . .

If the type of storing medium 34 of the recording and reproducing apparatus 4A is the built-in type, the processing routine advances to step S25 and the downloading of the contents is started in correspondence to step S20 mentioned above. In step S25, control is made so that the downloaded contents is recorded into the data storing unit 17 of the information apparatus 3 and also transferred to the recording and reproducing apparatus 4A connected to the information apparatus 3 and recorded also into the storing medium 34 of the recording and reproducing apparatus 4A.

However, the process of step S25 is executed only at the first time among the processes which are repeated for each of a plurality of recording and reproducing apparatuses 4A, 4B, . . . connected to the information apparatus 3. In other words, at the second and subsequent times of the repetition, in step S25, only the transfer of the contents to the second and subsequent recording and reproducing apparatuses 4 from the information apparatus 3 and the recording of the contents to the storing media 34 possessed by the recording and reproducing apparatuses 4 are executed. At this time, as contents which is transferred to the second and subsequent recording and reproducing apparatuses 4, the contents recorded in the data storing unit 17 of the information apparatus 3 at the time of the first process can be used instead of the contents downloaded from the contents distributing server 1. After the process of step S25, the processing routine advances to step S27.

If the storing medium 34 of the recording and reproducing apparatus 4A is the media type, the processing routine advances to step S23. Whether or not the storing medium 34 has been loaded into the recording and reproducing apparatus 4A is discriminated. If it is determined that the storing medium 34 has already been loaded into the recording and reproducing apparatus 4A, the processing routine advances to step S25. The recording of the downloaded contents to the data storing unit 17 possessed by the information apparatus 3, the transfer of the downloaded contents to the recording and reproducing apparatus 4A, and the recording of the transferred contents to the storing media 34 of the recording and reproducing apparatuses 4A are executed.

If it is determined in step S23 that the storing medium 34 is not loaded into the recording and reproducing apparatus 4A, the processing routine advances to step S24. In step S24, for example, the UI 42 allows a dialog box to be displayed or the like, thereby urging the user to load the storing medium 34 into the recording and reproducing apparatus 4A. If the user selects the loading of the storing medium 34, the apparatus waits for the loading of the storing medium 34 by a processing step (not shown) and, after that, the processing routine is returned to step S23. If the user selects a mode in which the storing medium 34 is not loaded, the processing routine advances to step S26.

In step S26, the downloading of the contents is started in correspondence to step S20 mentioned above. In step S26, the downloaded contents is recorded only into the data storing unit 17 possessed by the information apparatus 3. However, the process of step S26 is executed only at the first time among the processes which are repeated for each of a plurality of recording and reproducing apparatuses 4A, 4B, . . . connected to the information apparatus 3. After completion of the process of step S26, the processing routine advances to step S27.

In step S27, whether or not the recording of the contents has been finished to all of a plurality of recording and reproducing apparatuses 4A, 4B, . . . connected to the information apparatus 3 is discriminated. If it is determined that the recording to all of the recording and reproducing apparatuses 4A, 4B, . . . is not finished yet, the processing routine is returned to step S22. The processes to the next recording and reproducing apparatus 4 (in this example, recording and reproducing apparatus 4B) are started.

If it is determined in step S21 mentioned above that the recording and reproducing apparatus 4 is not connected to the information apparatus 3, the processing routine advances to step S26. The downloading of the contents is started in correspondence to step S20 mentioned above. The downloaded contents is recorded into only the storing unit 17 possessed by the information apparatus 3 and the processing routine advances to step S27. If the processing routine advances directly to step S26 from step S21, this corresponds to the case where no recording and reproducing apparatus 4 is connected to the information apparatus 3. Therefore, in next step S27 as well, the discrimination about whether the contents has been recorded to all of the recording and reproducing apparatuses connected to the information apparatus 3 is omitted and a series of processes is finished.

In step S27, the processes are stopped by an instruction to the UI 42 by the user and the series of processes can be finished in the state where the recording of the contents to all of the recording and reproducing apparatuses 4A, 4B, . . . connected to the information apparatus 3 is not finished.

Also in the modification of the embodiment of the invention, in a manner similar to the foregoing embodiment, the check-out process is also simultaneously executed at the time of the process of step S25 mentioned above. That is, when the downloaded contents is transferred to the recording and reproducing apparatus 4, the number of copy permission times of the contents recorded in the data storing unit 17 of the information apparatus 3 is automatically decreased by "1".

For example, if the number of copy permission times of the contents whose downloading has been requested in step S20 is equal to 3 times, when the contents is downloaded by the process of the first time, the number of copy permission times of the contents which is recorded in the data storing unit 17 is decreased from 3 times by "1" and set to 2 times. The number of copy permission times of the contents which is transferred from the information apparatus 3 to the recording and reproducing apparatus 4A and recorded into the storing medium 34 is set to 1 time.

In step S25 of the process at the second time, when the contents is transferred from the information apparatus 3 to the recording and reproducing apparatus 4B and recorded into the storing medium 34 possessed by the recording and reproducing apparatus 4B, the number of copy permission times of the contents recorded in the data storing unit 17 of the information apparatus 3 is further decreased by "1" and set to 1 time and the number of copy permission times of the contents which is transferred to the recording and reproducing apparatus 4B and recorded in the storing medium 34 is set to 1 time.

If the number of copy permission times is smaller than the number of recording and reproducing apparatuses 4 connected to the information apparatus 3, it is desirable that when the number of copy permission times of the contents recorded in the data storing unit 17 of the information apparatus 3 is equal to, for example, 0 time, a message for notifying the UI 42 of such a fact is displayed. At this time, it is more preferable if the user can select either a mode to additionally purchase the contents or a mode to stop the transferring process.

More specific examples of the recording and reproducing apparatus 4 which can be applied to the embodiment of the invention and to the modification of the embodiment will now be described with reference to FIGS. 7 to 13.

In the recording and reproducing apparatus 4, a magnetooptic disk is used as a recording medium and it corresponds to the media type mentioned above. Physical attributes of the disk such as a form factor are substantially the same as those of the disc which is used by, what is called, an MD (Mini-Disc) system. However, data recorded on the disk and a layout of the data on the disk are different from those of the conventional MD.

More specifically speaking, to record and reproduce the contents data such as audio data, the recording and reproducing apparatus 4 uses an FAT (File Allocation Table) system as a file management system. By this system, the apparatus can guarantee compatibility with the existing personal computer.

In the recording and reproducing apparatus 4, by improving the error correction system and modulation system as compared with the existing MD system, a recording capacity of the data is increased and the reliability of the data is raised. Further, in the recording and reproducing apparatus 4, the contents data is encrypted and an illegal copy is prevented, thereby protecting the copyright of the contents data.

As formats for recording and reproducing, there are the following two kinds of specifications: the specifications of the next-generation MD1 using the disc (that is, physical medium) that is substantially the same as the disc used in the existing MD system; and the specifications of the next-generation MD2 in which although the form factor and an external size are similar to those of the disc which is used in the existing MD system, by using an MSR (Magnetically induced Super Resolution) technique, recording density in the linear recording direction is increased and the recording capacity is further increased.

According to the specifications of the next-generation MD1, the total data recording capacity per disc is equal to about 300 Mbytes (in the case of using the disc of 80 minutes). By changing the modulation system from EFM (Eight to Fourteen Modulation) to RLL (1,7)PP (RLL: Run Length Limited, PP: Parity Preserve/Prohibit rmtr (repeated minimum transition runlength)) (hereinafter, referred to as a 1-7 pp modulation), a window margin is changed from 0.5 to 0.666. Consequently, 1.33 times as high density can be realized. By changing the error correction system from ACIRC (Advanced Cross Interleave Reed-Solomon Code) system to a combination of BIS (Burst Indicator Subcode) and LDC (RS-LDC: Reed Solomon-Long Distance Code), data efficiency is improved. Consequently, 1.48 times as high density can be realized. Integratedly, the data capacity of about 2 times as high as that of the existing MD system is realized by using substantially the same disc as that of the existing MD system.

In the disc of the specifications of the next-generation MD2 using the MSR technique, the further higher density in the linear recording direction is realized and the total data recording capacity is equal to about 1 Gbytes.

The recording and reproducing apparatus 4 is designed so that it can also correspond to the specifications of the existing MD system.

Figure 7:
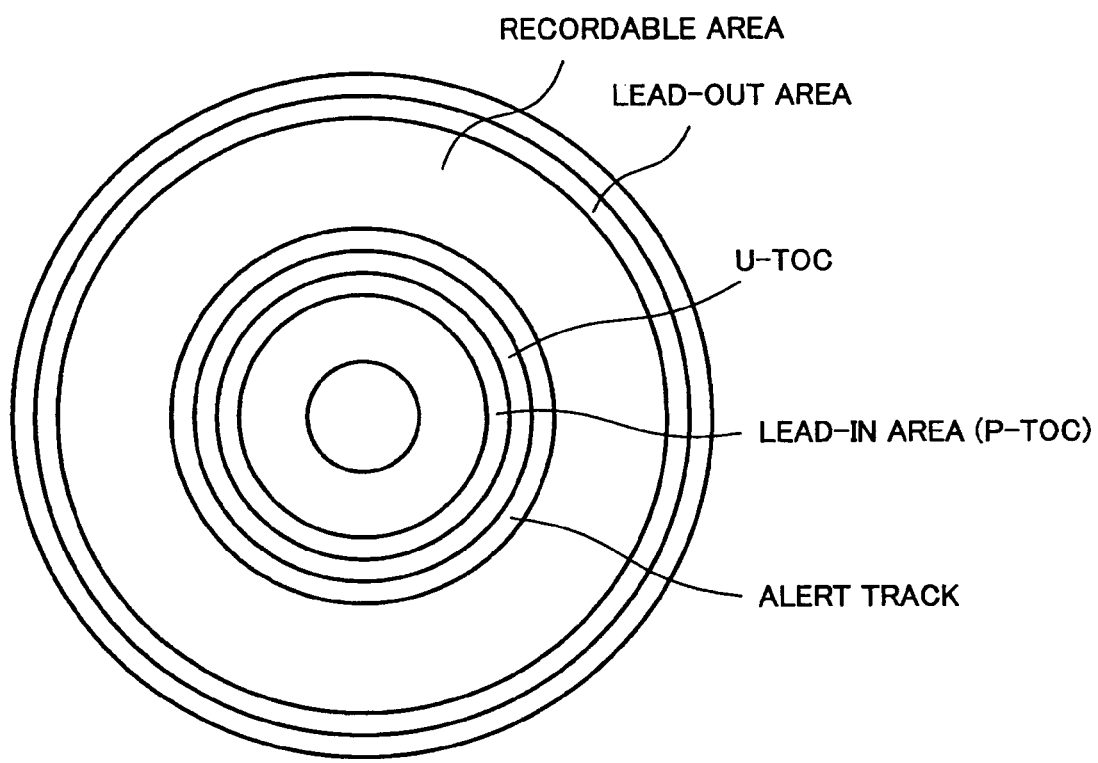
FIG. 7 is a diagram for use in explanation of a disc of specifications of an MD1 system of the next generation.

FIG. 7 shows a construction of the disc of the next-generation MD1. The disc of the existing MD system is used as it is in common as a disc of the next-generation MD1. That is, the disc is formed by laminating a dielectric film, a magnetic film, a dielectric film, and a reflective film onto a transparent polycarbonate substrate. A protective film is further laminated on the laminated layer.

As a disc of the next-generation MD1, a P-TOC (Premastered TOC (Table Of Contents)) area is provided in a lead-in area of an inner rim (the innermost rim ("innermost" indicates the most inside periphery in the direction extending radially from the center of the disc) of a recordable area of the disc) of the disc as shown in FIG. 7. As a physical structure, the P-TOC area becomes a premastered area. That is, control information and the like have been recorded, for example, as P-TOC information by emboss pits.

An outer rim (outside periphery in the direction extending radially from the center of the disc) of the lead-in area where the P-TOC area is provided is the recordable area (area where data can be magnetooptically recorded) and it is a recordable/reproducible area in which grooves have been formed as guide grooves of recording tracks. A U-TOC (user TOC) is provided in the inner rim of the recordable area.

The U-TOC has a construction similar to that of the U-TOC used for recording management information of the disc in the existing MD system. In the existing MD system, the U-TOC is management information which is rewritten in accordance with order of music pieces on the tracks (audio track/data track), recording, deletion, or the like and is used to manage a start position, an end position, and a mode with respect to each track (parts constructing the track).

An alert track is provided in the outer rim of the U-TOC. An alert sound which is activated (outputted) by an MD player when the disc is loaded into the existing MD system is recorded on the alert track. The alert sound shows that the disc is used in the next-generation MD1 system and cannot be reproduced by the existing MD system. A residual portion (details are shown in FIG. 8) of the recordable area is extended to the lead-out area in the direction extending radially.

Figure 8:
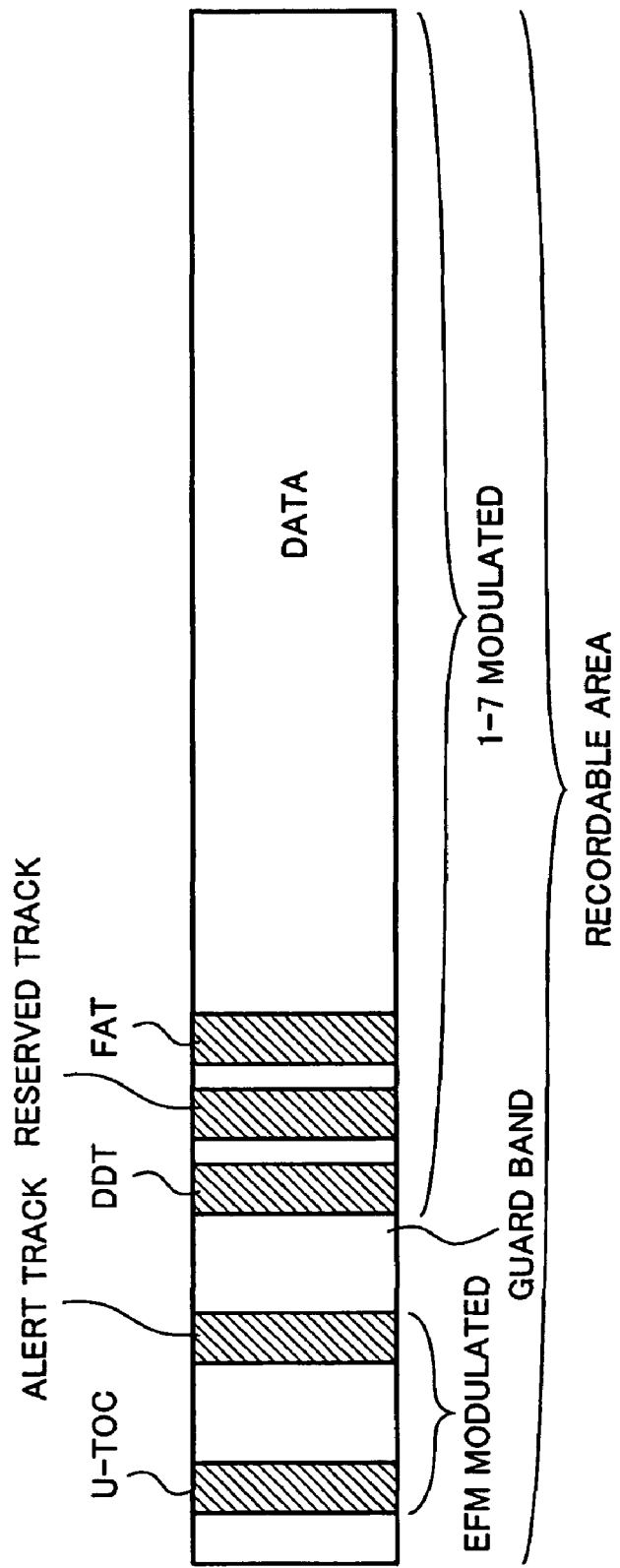
FIG. 8 is a diagram for use in explanation of a recording area of the disc of the specifications of the MD1 system of the next generation.

FIG. 8 shows a construction of the recordable area of the disc of the specifications of the next-generation MD1 shown in FIG. 7. As shown in FIG. 8, the U-TOC and the alert track are provided at the head (inner rim side) of the recordable area. In the area including the U-TOC and the alert track, data is modulated by the EFM and recorded so that it can be reproduced also by the player of the existing MD system. An area where the data is modulated by the 1-7 pp modulation of the next-generation MD1 system and recorded is provided in the outer rim of the area where the data is modulated by the EFM modulation and recorded. The area where the data is modulated by the EFM and recorded and the area where the data is modulated by the 1-7 pp modulation and recorded are arranged so as to be away from each other at a predetermined distance and a "guard band" is provided in a region between those areas. Since such a guard band is provided, an inconvenience that is caused when the disc of the specifications of the next-generation MD1 is loaded into the existing MD player is prevented.

A DDT (Disc Description Table) area and a reserve track are provided at the head (inner rim side) of the area where the data is modulated by the 1-7 pp modulation and recorded. The DDT area is provided to execute an alternating process for alternating an area which is physically defective. Further, a unique ID (UID) is recorded in the DDT area. The UID is an identification code that is unique to each recording medium and is recorded on the basis of, for example, random numbers which are arbitrarily generated. Information to protect the contents is stored in the reserve track.

Further, an FAT (File Allocation Table) area is provided in the area where the data is modulated by the 1-7 pp modulation and recorded. The FAT area is an area for managing the data by an FAT system. The FAT system performs data management according to an FAT system used in the general personal computer. The FAT system performs file management by an FAT chain by using a directory showing an entry point of a file existing on a route or a directory and an FAT table in which link information of an FAT cluster has been described. Terminologies in the FAT are integratedly used so as to show various different file managing methods which are used in an operating system of the personal computer or the like.

In the disc of the specifications of the next-generation MD1, information indicative of the start position of the alert track and information indicative of the start position of the area where the data is modulated by the 1-7 pp modulation and recorded are recorded in the U-TOC area.

When the disc of the next-generation MD1 is loaded into the player of the existing MD system, the U-TOC area is read out. The position of the alert track is known from the information of the U-TOC. The alert track is accessed and the reproduction of the alert track is started. When the disc of the next-generation MD1 is loaded into the player which conforms with the next-generation MD1, the U-TOC area is read out. The start position of the area where the data is modulated by the 1-7 pp modulation and recorded is known from the information of the U-TOC. The DDT, the reserve track, and the FAT area are read out. In the area of the 1-7 pp modulated data, the data management is made by using the FAT system without using the U-TOC.

FIG. 9 shows a disc of the next-generation MD2. The disc is formed by laminating a dielectric film, a magnetic film, a dielectric film, and a reflective film onto a transparent polycarbonate substrate. A protective film is further laminated on the laminated layer.

Figure 9A:
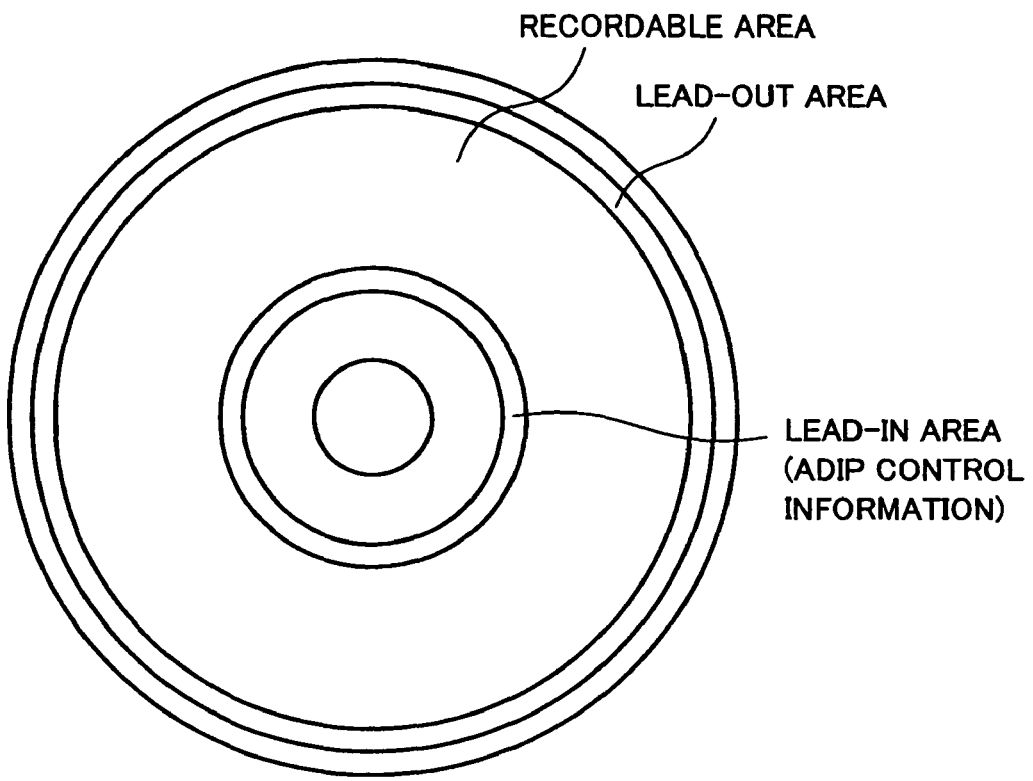
FIGS. 9A and 9B are diagrams for use in explanation of a disc of specifications of an MD2 system of the next generation.

In the disc of the next-generation MD2, as shown in FIG. 9A, control information is recorded by an ADIP (Address in Pregroove) signal in a lead-in area of an inner rim (inside periphery in the direction extending radially from the center of the disc) of the disc. In the disc of the next-generation MD2, the P-TOC by the emboss pits is not provided for the lead-in area. In place of it, the control information by the ADIP signal is used. The recordable area is started from the outer rim of the lead-in area and becomes a recordable/reproducible area in which the grooves have been formed as guide grooves of the recording tracks. The data is modulated by the 1-7 pp modulation and recorded in the recordable area.

Figure 9B:
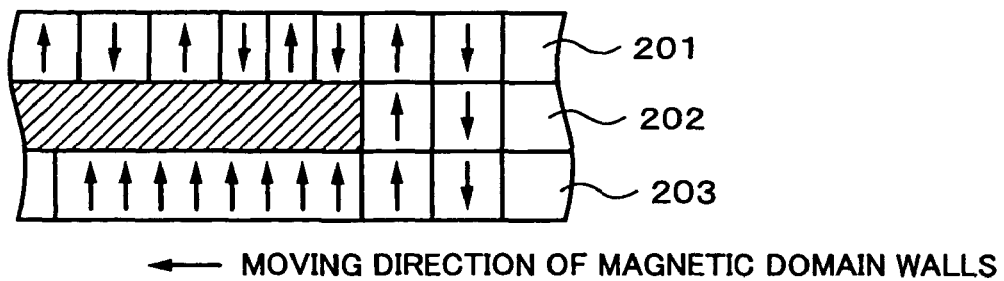

In the disc of the specifications of the next-generation MD2, as shown in FIG. 9B, a layer obtained by laminating a magnetic layer 201 as a recording layer for recording information, a cutting layer 202, and a magnetic layer 203 for reproducing information is used as a magnetic film. The cutting layer 202 becomes a switched bonding power adjusting layer. When the disc becomes a predetermined temperature, the cutting layer 202 becomes a magnetically neutral state and magnetic domain walls transferred to the recording layer 201 are transferred to the magnetic layer 203 for reproduction. Thus, micro marks in the recording layer 201 are seen as if they were enlarged in a beam spot of the reproducing magnetic layer 203.

Whether the loaded disc is a disc of the next-generation MD1 or a disc of the next-generation MD2 can be discriminated, for example, from the information recorded in the lead-in area. That is, if the P-TOC by the emboss pits is detected in the lead-in area, it is possible to determine that the disc is the disc of the existing MD or the disc of the next-generation MD1. If the control information by the ADIP signal is detected in the lead-in area and the P-TOC by the emboss pits is not detected, it is possible to determine that the disc is the disc of the next-generation MD2. The discriminating method of the next-generation MD1 and the next-generation MD2 is not limited to such a method. The disc can be also discriminated by a phase of a tracking error signal which is obtained in the on-track state and the off-track state. A detection hole or the like for discrimination of the disc can be also formed.

FIG. 10 shows a construction of the recordable area of the disc of the specifications of the next-generation MD2. As shown in FIG. 10, the data is modulated by the 1-7 pp modulation and recorded in the whole recordable area. A DDT area and a reserve track are provided in a head (inner rim side) of the area where the data is modulated by the 1-7 pp modulation and recorded. The DDT area is provided to record alternating area management data for managing an alternating area for alternating an area which is physically defective.

Specifically speaking, a management table for managing a rewriting area including the recordable area which is substituted for the physically defective area is recorded in the DDT area. In this management table, the logical cluster determined to be a defective cluster is recorded and (one or a plurality of) logical cluster(s) in the replacing area which was/were allocated as a cluster/clusters that can be substituted for the defective logical cluster is/are also recorded. Further, the foregoing UID is recorded in the DDT area. Information to protect the contents is stored in the reserve track.

Moreover, an FAT area is provided in the area where the data is modulated by the 1-7 pp modulation and recorded. The FAT area is an area where the data is managed by the FAT system. The FAT system performs the data management which conforms with the FAT system used in the general personal computer.

The U-TOC area is not provided in the disc of the next-generation MD2. If the disc of the next-generation MD2 is loaded into a player which conforms with the next-generation MD2, the DDT, reserve track, and FAT area recorded in predetermined positions are read out and the data management is performed by using the FAT system.

In the disc of the next-generation MD1 and the disc of the next-generation MD2, the initializing operation which requires a time is unnecessary. That is, in the discs of the specifications of the next-generation MD1 and the next-generation MD2, the initializing operation other than the operation to form the minimum table of the DDT, reserve track, and FAT area is unnecessary and recording and reproduction of the recordable area can be directly executed from a disc which is not yet used.

Figure 11:
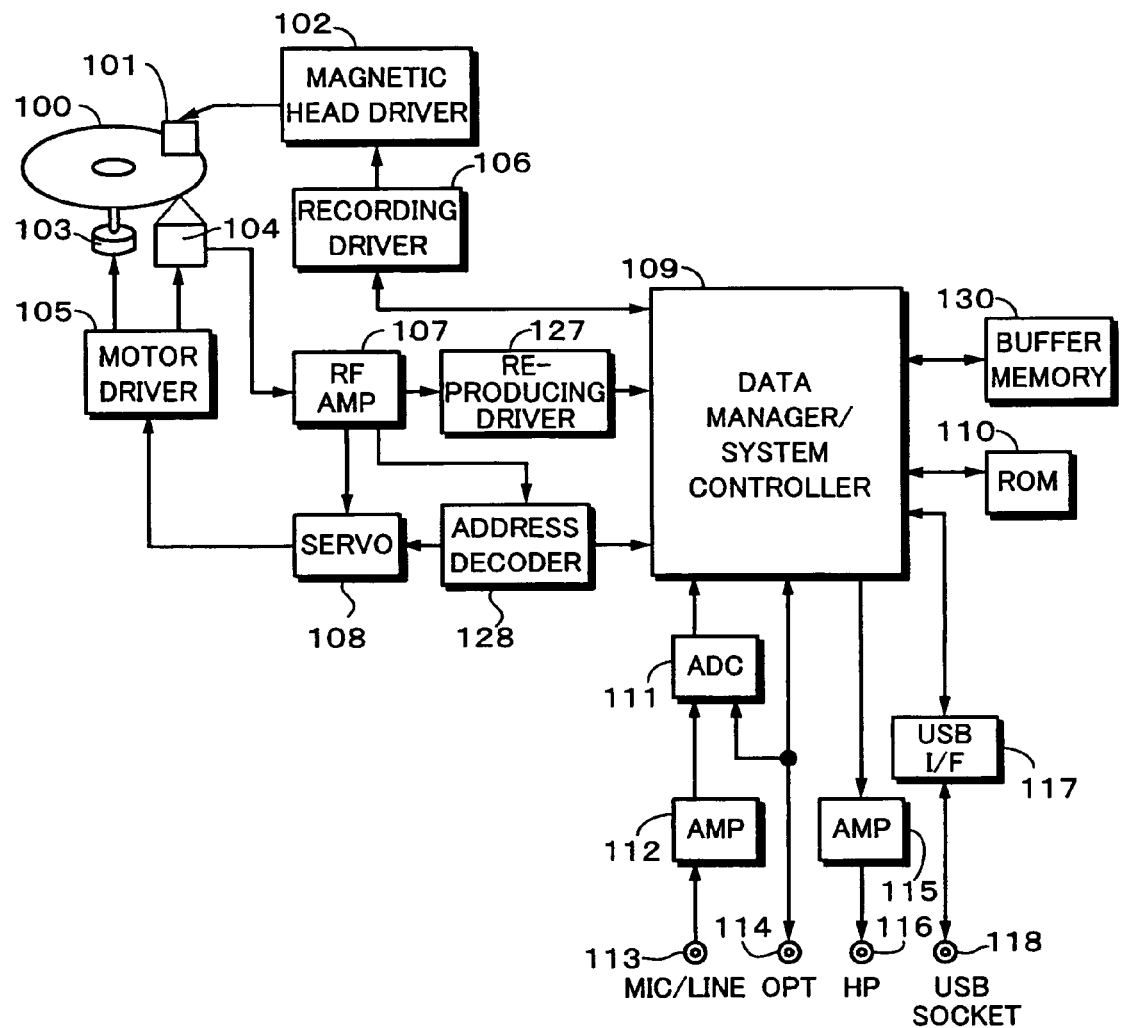
FIG. 11 is a block diagram showing a construction of an example of a recording and reproducing apparatus using the discs according to the next-generation MD1 system, the next-generation MD2 system, and the existing MD system as recording media.

FIG. 11 shows a construction of an example of the recording and reproducing apparatus 4 using the discs of the next-generation MD1 system, the next-generation MD2 system, and the existing MD system mentioned above as storing media 34. The recording and reproducing apparatus 4 has a turntable on which any one of the disc of the existing MD system, the disc of the next-generation MD1, and the disc of the next-generation MD2 is mounted. A disc 100 mounted on the turntable is rotated by a spindle motor 103 by a CLV (Constant Linear Velocity) system. A laser beam is irradiated onto the disc 100 by an optical head 104 upon recording/reproducing.

In the recording mode, the optical head 104 emits a laser beam of a high level for heating the recording track to a Curie temperature. In the reproducing mode, the optical head 104 emits a laser beam of a relatively low level for detecting data from the reflection light by a magnetic Kerr effect. Therefore, the optical head 104 is equipped with: a laser diode as laser output means (details are not shown here); an optical system comprising a polarization beam splitter, an objective lens, and the like; and a detector for detecting the reflection light. The objective lens provided for the optical head 104 is held by, for example, a biaxial mechanism so that it can be deviated in the radial direction of the disc and the direction in which the lens is come into contact with or away from the disc.

A magnetic head 101 is arranged at a position where it faces the optical head 104 through the disc 100. The magnetic head 101 executes the operation for applying a magnetic field modulated by the recording data onto the disc 100. Although not shown, a sled motor and a sled mechanism for moving the whole optical head 104 and the magnetic head 101 in the disc radial direction are provided.

In the case of the disc of the next-generation MD2, the optical head 104 and the magnetic head 101 can form the micro marks by executing pulse driving magnetic field modulation. In the case of the disc of the existing MD or the disc of the next-generation MD1, a magnetic field modulation system of DC light emission is used.

In the recording and reproducing apparatus 4, a recording processing system, a reproducing processing system, a servo system, and the like are provided besides the recording/reproducing head system by the optical head 104 and the magnetic head 101 and the disc rotation driving system by the spindle motor 103.

There is a possibility that any one of the disc of the specifications of the existing MD, the disc of the specifications of the next-generation MD1, and the disc of the specifications of the next-generation MD2 is loaded as a disc 100. Linear velocities are different in dependence on those discs. Therefore, the spindle motor 103 can rotate the disc at a rotational speed corresponding to a desired one of a plurality of kinds of discs of the different linear velocities. The disc 100 mounted on the turntable is rotated in correspondence to a desired one of the linear velocity of the disc of the specifications of the existing MD, the linear velocity of the disc of the specifications of the next-generation MD1, and the linear velocity of the disc of the specifications of the next-generation MD2.

In the recording processing system, in the case of the disc of the existing MD system, upon recording of the audio tracks, the error correction encoding is executed by the ACIRC and the data is modulated by the EFM and recorded. In the case of the disc of the next-generation MD1 or the next-generation MD2, the error correction encoding is executed by a system in which the BIS and the LDC are combined and a recording driver 106 for modulating the data by the 1-7 pp modulation and recording it is provided. A corresponding portion of the recording driver 106 can be switched in dependence on the type of disc 100, that is, whether it is the disc of the existing MD system or the disc of the next-generation MD1 or the next-generation MD2.

In the reproducing processing system, upon reproduction of the disc of the existing MD system, demodulation of the EFM and the error correcting process by the ACIRC are executed. Upon reproduction of the disc of the next-generation MD1 system or the next-generation MD2 system, there is provided a reproducing driver 127 for executing 1-7 demodulation based on data detection using Partial Response and Viterbi decoding and the error correcting process by the BIS and the LDC. A corresponding portion of the reproducing driver 127 can be switched in dependence on the type of disc 100, that is, whether it is the disc of the existing MD system or the disc of the next-generation MD1 or the next-generation MD2.

The information (photocurrent which is obtained by detecting the reflection light of the laser beam by a photodetector) detected as reflection light of the laser beam emitted to the disc 100 by the optical head 104 is supplied to an RF amplifier 107.

In the RF amplifier 107, current-voltage conversion, amplification, a matrix arithmetic operation, and the like are executed to the inputted detection information and a reproduction RF signal as reproduction information, a tracking error signal TE, a focusing error signal FE, group information (ADIP information recorded on the disc 100 by wobbling of the track), and the like are extracted.

When the disc of the existing MD system is reproduced, the reproduction RF signal obtained by the RF amplifier is supplied to the reproducing driver 127, binarized into an EFM signal train, and thereafter, EFM demodulated. Further, error correction and a deinterleaving process are executed by the ACIRC decoder. That is, at this point of time, the reproduction RF signal enters the state of the ATRAC compression data. The demodulated ATRAC compression data becomes reproduction data from the disc 100. The reproduction data is supplied to a data manager/system controller unit 109.

When the disc of the next-generation MD1 or the next-generation MD2 is reproduced, the reproduction RF signal obtained by the RF amplifier 107 is supplied to the reproducing driver 127. Reproduction data as an RLL(1-7) code train is obtained by data detection using PR(1,2,1)ML or PR(1,-1)ML and the Viterbi decoding. An RLL(1-7) demodulating process is executed to the RLL(1-7) code train. Further, error correction and a deinterleaving process are executed by an RS-LDC decoder. The demodulated data is outputted as reproduction data from the disc 100. The reproduction data is supplied to the data manager/system controller unit 109.

In the reproduction data supplied to the data manager/system controller unit 109, the compression code is decoded by using a buffer memory 130 and becomes reproduction audio data. The reproduction audio data is converted into an analog audio signal by a D/A converter (not shown) and supplied to an amplifier 115. The analog audio signal is amplified by the amplifier 115 so that it can drive headphones or speakers, and outputted to an output terminal 116.

The tracking error signal and the focusing error signal which are outputted from the RF amplifier 107 are supplied to a servo circuit 108 and the group information is supplied to an address decoder 128. In the address decoder 128, the group information is band-limited by a band pass filter and wobbling components are extracted. After that, frequency demodulation and biphase demodulation are executed, thereby demodulating the ADIP signal. An address is decoded by using the demodulated ADIP signal.

Although a detailed explanation is omitted here, a construction of the address on the disc 100 of each of the existing MD system and the next-generation MD1 and that of the disc 100 of the next-generation MD2 are different. Therefore, the address decoder 128 has: an address decoder corresponding to the existing MD system and the next-generation MD1 system; and an address decoder corresponding to the next-generation MD2 system.

The ADIP address decoded from the ADIP signal is supplied to a drive controller (not shown) and a desired control process is executed on the basis of the ADIP address. The group information is supplied to the servo circuit 108 for controlling a spindle servo.

The servo circuit 108 forms a spindle error signal for CLV or CAV servo control on the basis of, for example, an error signal obtained by integrating a phase error between the group information and a reproducing clock (PLL system clock upon decoding).

The servo circuit 108 also forms various servo control signals (a tracking control signal, a focusing control signal, a sled control signal, a spindle control signal, and the like) on the basis of the spindle error signal, the tracking error signal and the focusing error signal supplied from the RF amplifier 107, or a track jump instruction, an access instruction, and the like from a drive controller and outputs them to a motor driver 105. That is, necessary processes such as phase compensating process, gain process, target value setting process, and the like are executed to the servo error signal and the instructions, thereby forming the various servo control signals.

The motor driver 105 forms desired servo drive signals on the basis of the servo control signals supplied from the servo circuit 108. As servo drive signals here, there are biaxial drive signals (two kinds of signals in the focusing direction and the tracking direction) to drive a biaxial mechanism, a sled motor drive signal to drive a sled mechanism, and a spindle motor drive signal to drive the spindle motor 103. Focusing control and tracking control for the disc 100 and CLV or CAV control for the spindle motor 103 are made by those servo drive signals.

When the audio data is recorded, the analog audio signal is inputted from a microphone/line (MIC/LINE) input terminal 113, converted into a digital audio signal by an ADC (Analog/Digital Converter) 111 through an amplifier 112, and supplied to the data manager/system controller unit 109. The digital audio signal is inputted, for example, from an optical digital signal (OPT) input terminal 114 and directly supplied to the data manager/system controller unit 109. It is also possible to change a sampling rate or the like by the ADC 111 and supply the resultant signal to the data manager/system controller unit 109. The data manager/system controller unit 109 compression-encodes the supplied digital audio signal by, for example, the ATRAC system by using the buffer memory 130.

When the audio data is recorded into the disc of the existing MD system, in the recording driver 106, the portions corresponding to the existing MD system function, so that an ACIRC encoder and an EFM modulating unit function. In this case, the compression-encoded audio data is interleaved and an error correction code is added to the audio data by the ACIRC encoder. After that, the EFM modulation is executed by the EFM modulating unit. The EFM modulated data is supplied to a magnetic head driver 102. The magnetic head 101 applies a magnetic field based on the EFM modulated data to the disc 100, thereby performing the recording of the audio track.

When the data is recorded to the disc of the next-generation MD1 or the next-generation MD2, in the recording driver 106, the portions corresponding to the next-generation MD1 or the next-generation MD2 function, so that an RS-LDC encoder and an RLL(1-7) PP modulating unit function. In this case, the high density data supplied from the data manager/system controller unit 109 is interleaved and an error correction code of the RS-LDC system is added to the data by the RS-LDC encoder. After that, RLL(1-7) modulation is executed by the RLL(1-7)PP modulating unit.

The recording data as an RLL(1-7) code train is supplied to the magnetic head driver 102 and the magnetic head 101 applies a magnetic field based on the modulation data to the disc 100, thereby executing the recording of the data track.

In the optical head 104, the laser beam emitting operation of the laser diode is executed by a laser driver/APC (not shown) upon reproduction and upon recording as mentioned above. A detector for monitoring a laser power is provided in the optical head 104. A monitor signal from the detector is fed back to the laser driver/APC, thereby realizing the APC operation. A power of the laser beam emitted from the laser diode is controlled so as to be stabilized to a set value.

A USB I/F 117 is further connected to the data manager/system controller unit 109. The data manager/system controller unit 109 can communicate with the connected information apparatus 3 through the USB I/F 117 and executes reception of a command such as writing request, reading request, or the like, transmission of status information and other necessary information, or the like.

When the reading request is received from the information apparatus 3, the data manager/system controller unit 109 reads out the data from the disc 100 on a recording unit basis (for example, cluster unit of every 64 kB) of the disc on the basis of this request and stores it into the buffer memory 130. The data stored in the buffer memory 130 is read out from the buffer memory 130 on a data unit basis (for example, sector unit of every 2 kB) of the FAT system. Thus, the access to the disc 100 by the FAT system is enabled. The data read out from the buffer memory 130 is supplied to the information apparatus 3 through the USB I/F 117. The data is also written onto the disc 100 in a manner similar to that mentioned above. For example, the data requested to be written on a sector unit basis of the FAT system is supplied to the data manager/system controller unit 109 from the information apparatus 3 through the USB I/F 117 and written into the buffer memory 130. The data manager/system controller unit 109 reads out the data written in the buffer memory 130 on a cluster unit basis and records it to the disc 100.

The property information of the recording and reproducing apparatus 4 is previously stored into a ROM 110 connected to the data manager/system controller unit 109. The information apparatus 3 transmits a reading request of the property information in the ROM 110 to the data manager/system controller unit 109 through the USB I/F 117, so that it can obtain the property information stored in the ROM 110.

Figure 12:
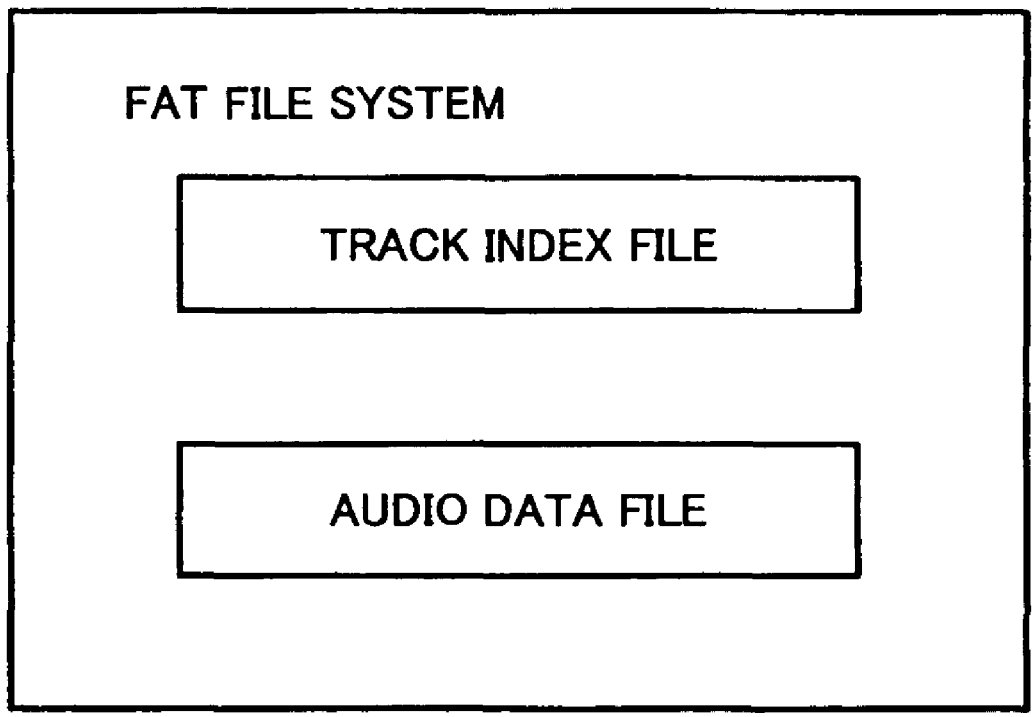
FIG. 12 is a diagram for use in explanation of a first example of a management system of audio data.

A managing method of the audio data in the next-generation MD1 and the next-generation MD2 will now be schematically explained. In the next-generation MD1 and the next-generation MD2, the following two methods have been proposed as a managing method of the audio data. FIG. 12 shows the first example of the managing method of the audio data which is applied to the next-generation MD1 and the next-generation MD2. As shown in FIG. 12, according to the managing method in the first example, a track index file and an audio data file are formed on the disc. The track index file and the audio data file are files which are managed by the FAT system.

According to the audio data file, a plurality of music data is enclosed as one file. When the audio data file is seen in the FAT system, it seems to be a large file. The inside of the audio data file is partitioned into parts and the audio data is handled as a set of parts.

The track index file is a file in which various information for managing the music data enclosed in the audio data file has been described. According to the first managing method, information of each music data, play list information showing a reproducing method of each music data, copyright management information comprising author information, copy limitation information, and the like of each music data, and the like are stored in the track index file.

When the contents (audio data) downloaded from the contents distributing server 1 by the information apparatus 3 is transferred to the recording and reproducing apparatus 4 and recorded to the disc 100 to which the first managing method is applied, the transferred audio data is coupled with the end of the audio data file and the track index file is rewritten so as to reflect the newly added audio data. At the same time, the copyright management information in the track index file is properly rewritten.

Figure 13:
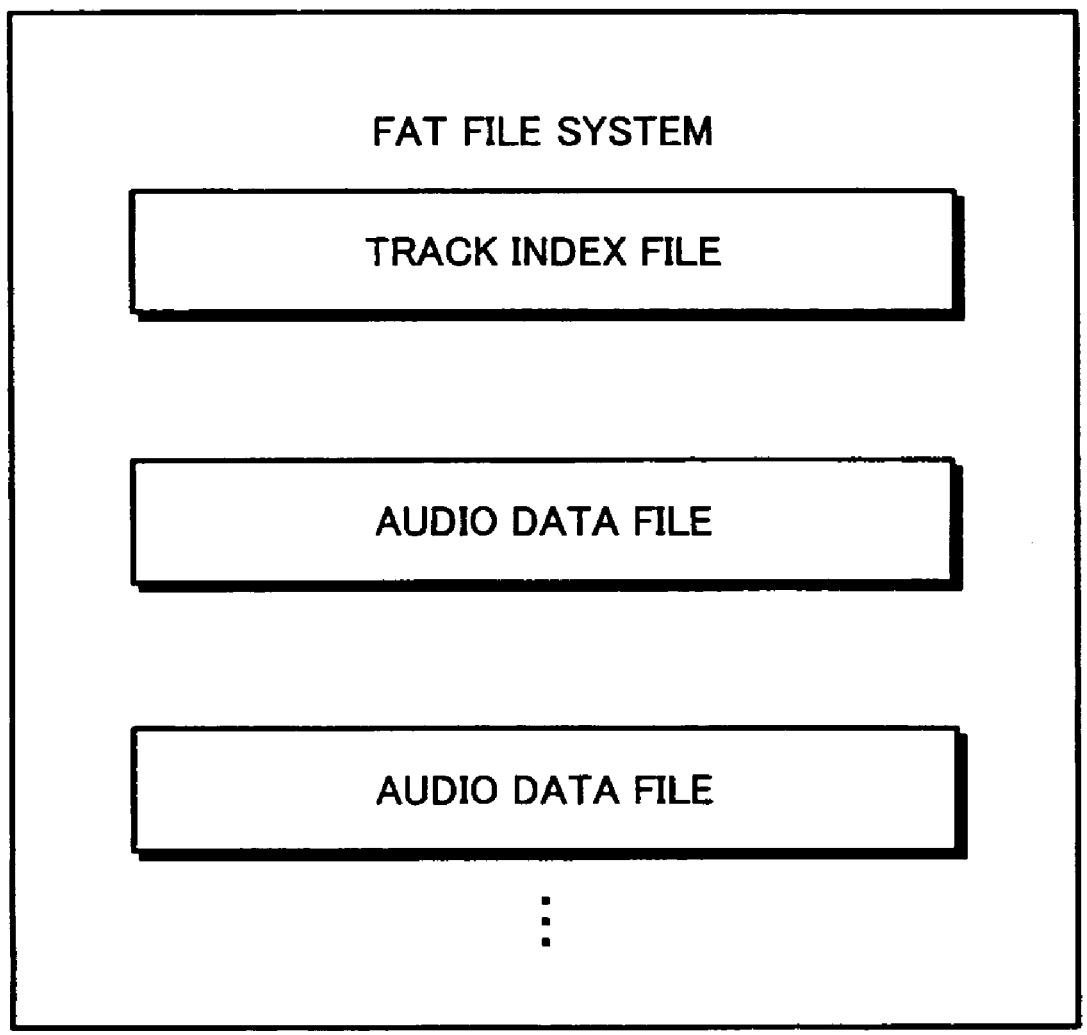
FIG. 13 is a diagram for use in explanation of a second example of the management system of audio data.

FIG. 13 shows the second example of the managing method of the audio data. As shown in FIG. 13, according to the managing method in the second example, a track index file and a plurality of audio data files are formed on the disc. The track index file and the plurality of audio data files are files which are managed by the FAT system.

According to the audio data file, music data is enclosed in the file so that one music piece corresponds to one file in principle. A header is provided for the audio data file. A title, decrypting key information, and copyright management information are recorded in the header and index information is also provided. Indices are provided to divide the music piece of one track into a plurality of subtracks. Positions of the subtracks divided by the indices are recorded in the header in correspondence to index numbers. For example, 255 indices can be set.

When the audio data downloaded from the contents distributing server 1 by the information apparatus 3 is transferred to the recording and reproducing apparatus 4 and recorded to the disc 100 to which the second managing method is applied, the transferred audio data is added as a new audio data file and recorded and the track index file is rewritten so as to reflect the newly added audio data. At the same time, the copyright management information in the header of the added audio data file is properly rewritten.

The invention has been described above on the assumption that the downloaded contents is stored into the data storing unit 17 possessed by the information apparatus 3, transferred to the recording and reproducing apparatus 4 connected to the information apparatus 3, and stored into the storing medium 34 of the recording and reproducing apparatus 4. However, the invention is not limited to such an example. For instance, it is also possible to store the downloaded contents data into the data storing unit 17 of the information apparatus 3 and record the contents to, for example, a CD-R loaded into the driving apparatus 22 possessed by the information apparatus 3.

The present invention is not limited to the foregoing embodiments but many modifications and variations are possible within the spirit and scope of the appended claims of the invention.

What is claimed is:

1. A receiving apparatus to download content data from a server through a network, comprising:
　　a communicating unit, included in the receiving apparatus, configured to communicate a reception start request for the content data to, and to download the content data from, said server through said network;
　　a storing unit, included in the receiving apparatus, configured to store the content data;
　　a connecting unit, included in the receiving apparatus, configured to connect a recording apparatus to the receiving apparatus;
　　a determining unit configured to determine whether a storing medium, used by the recording apparatus, is of a built-in type, in which the storing medium is built into the recording apparatus, or of a detachable type, in which the storing medium can be loaded into, and removed from, the recording apparatus;
　　a detecting unit configured to determine whether said storing medium has been loaded into the recording apparatus, when the recording apparatus is determined to use the storing medium of the detachable type; and
　　a controlling unit, included in the receiving apparatus, configured, for each reception start request communicated by the communicating unit to said server,
　　　to determine whether the downloaded content data is to be recorded into the recording apparatus, based on whether the recording apparatus is connected to said connecting unit when the reception start request to download the content data is communicated to said server and, when the storing medium is determined to be of the detachable type, based on the determination of whether the storing medium of the detachable type has been loaded;
　　　to automatically store the downloaded content data into the storing unit of the receiving apparatus, when the controlling unit determines that the downloaded content data is not to be recorded into the recording apparatus, and
　　　to automatically store the downloaded content data into the storing unit of the receiving apparatus and to automatically record the downloaded content data into the recording apparatus, when the controlling unit determines that the downloaded content data is to be recorded into the recording apparatus.

2. The apparatus according to claim 1, wherein, when the controlling unit detects that a plurality of recording apparatuses is connected to said connecting unit, said downloaded content data is transferred to said plurality of recording apparatuses, respectively.

3. The apparatus according to claim 2, wherein the storing of said downloaded content data into said storing unit is executed only once in response to said downloaded content data being transferred to said plurality of recording apparatuses.

4. The apparatus according to claim 1, wherein a check-out of said downloaded content data stored in said storing unit is automatically executed in accordance with the recording of said downloaded content data into the recording apparatus.

5. The apparatus according to claim 1, wherein when said recording apparatus is not connected to said connecting unit when the reception start request to download the content data is communicated to said server, said controlling unit is configured to only store said downloaded content data into said storing unit without queuing the downloaded content data for subsequent transfer to the recording apparatus.

6. A receiving method of a receiving apparatus for downloading content data from a server through a network, comprising:
    determining whether a storing medium, used by a recording apparatus, is of a built-in type, in which the storing medium is built into the recording apparatus, or of a detachable type, in which the storing medium can be loaded into, and removed from, the recording apparatus;
    determining whether said storing medium has been loaded into the recording apparatus, when the recording apparatus is determined to use the storing medium of the detachable type;
    determining, by the receiving apparatus, whether downloaded content data is to be recorded into the recording apparatus, based on whether the recording apparatus is connected to a connecting unit of the receiving apparatus when a reception start request to download the content data is communicated to said server and, when the storing medium is determined to be of the detachable type, based on the determination of whether the storing medium of the detachable type has been loaded;
    automatically storing, by the receiving apparatus, the downloaded content data into a storing unit of the receiving apparatus, when the determining whether downloaded content data is to be recorded step determines that the downloaded content data is not to be recorded into the recording apparatus; and
    automatically storing, by the receiving apparatus, said downloaded content data into the storing unit of the receiving apparatus and automatically recording said downloaded content data into the recording apparatus, when the determining whether downloaded content data is to be recorded step determines that the downloaded content data is to be recorded into the recording apparatus, wherein
    the determining whether downloaded content data is to be recorded step, and one of the automatically storing step or the automatically storing and automatically recording step, are performed for each reception start request communicated by the communicating unit of the receiving apparatus.

7. A receiving program for allowing a computer apparatus to execute a receiving method of a receiving apparatus for downloading content data from a server through a network, the receiving method comprising:
    determining whether a storing medium, used by a recording apparatus, is of a built-in type, in which the storing medium is built into the recording apparatus, or of a detachable type, in which the storing medium can be loaded into, and removed from, the recording apparatus;
    determining whether said storing medium has been loaded into the recording apparatus, when the recording apparatus is determined to use the storing medium of the detachable type;
    determining, by the receiving apparatus, whether downloaded content data is to be recorded into the recording apparatus, based on whether the recording apparatus is connected to a connecting unit of the receiving apparatus when a reception start request to download the content data is communicated to said server and, when the storing medium is determined to be of the detachable type, based on the determination of whether the storing medium of the detachable type has been loaded;
    automatically storing, by the receiving apparatus, the downloaded content data into a storing unit of the receiving apparatus, when the determining whether downloaded content data is to be recorded step determines that the downloaded content data is not to be recorded into the recording apparatus; and
    automatically storing, by the receiving apparatus, said downloaded content data into the storing unit of the receiving apparatus and automatically recording said downloaded content data into the recording apparatus, when the determining whether downloaded content data is to be recorded step determines that the downloaded content data is to be recorded into the recording apparatus, wherein
    the determining whether downloaded content data is to be recorded step, and one of the automatically storing step or the automatically storing and automatically recording step, are performed for each reception start request communicated by the communicating unit of the receiving apparatus.

8. A non-transitory computer-readable storage medium having embedded therein instructions, which when executed by a processor, cause the processor to perform a receiving method of a receiving apparatus for downloading content data from a server through a network, the receiving method comprising:
    determining whether a storing medium, used by a recording apparatus, is of a built-in type, in which the storing medium is built into the recording apparatus, or of a detachable type, in which the storing medium can be loaded into, and removed from, the recording apparatus;
    determining whether said storing medium has been loaded into the recording apparatus, when the recording apparatus is determined to use the storing medium of the detachable type;
    determining, by the receiving apparatus, whether downloaded content data is to be recorded into the recording apparatus, based on whether the recording apparatus is connected to a connecting unit of the receiving apparatus when a reception start request to download the content data is communicated to said server and, when the storing medium is determined to be of the detachable type, based on the determination of whether the storing medium of the detachable type has been loaded;
    automatically storing, by the receiving apparatus, the downloaded content data into a storing unit of the receiving apparatus, when the determining whether downloaded content data is to be recorded step determines that the downloaded content data is not to be recorded into the recording apparatus; and automatically storing, by the receiving apparatus, said downloaded content data into the storing unit of the receiving apparatus and automatically recording said downloaded content data into the recording apparatus, when the determining whether downloaded content data is to be recorded step determines that the downloaded content data is to be recorded into the recording apparatus, wherein the determining whether downloaded content data is to be recorded step, and one of the automatically storing step and the automatically storing and automatically recording step, are performed for each reception start request communicated by the communicating unit of the receiving apparatus.

9. A receiving apparatus to download content data from a server through a network, comprising:

a communicating unit, included in the receiving apparatus, configured to communicate a reception start request for the content data to, and to download the content data from, said server through said network;

a first storing unit, included in the receiving apparatus, which is fixedly used;

a determining unit configured to determine whether a storing medium, used by the detachable second storing unit is of a built-in type, in which the storing medium is built into the detachable second storing unit, or of a detachable type, in which the storing medium can be loaded into, and removed from, the detachable second storing unit;

a detecting unit configured to determine whether the storing medium has been loaded into the detachable second storing unit, when the detachable second storing unit is determined to use the storing medium of the detachable type; and a controlling unit, included in the receiving apparatus, configured, for each reception start request communicated by the communicating unit to said server, to determine whether the downloaded content data is to be stored in a detachable second storing unit, based on whether the detachable second storing unit can be used when the reception start request to download the content data is communicated to said server and, when the storing medium is determined to be of the detachable type, based on the determination of whether the storing medium of the detachable type has been loaded;

to automatically store the downloaded content data into the first storing unit of the receiving apparatus, when the controlling unit determines that the downloaded content data is not to be stored in the detachable second storing unit, and to automatically store the downloaded content data into the first storing unit of the receiving apparatus and to automatically record the downloaded content data into the detachable second storing unit, when the controlling unit determines that the downloaded content data is to be stored in the detachable second storing unit.

10. The apparatus according to claim 9, further comprising:

a connecting unit configured to connect to the detachable second storing unit.

11. The apparatus according to claim 9, wherein, when the controlling unit detects that a plurality of detachable second storing units can be used, said downloaded content data is transferred to said plurality of detachable second storing units, respectively.

12. The apparatus according to claim 11, wherein the storage of said downloaded content data into said first storing unit is executed only once in response to said downloaded content data being transferred to said plurality of detachable second storing units.

13. The apparatus according to claim 9, wherein a checkout of said downloaded content data stored in said first storing unit is automatically executed in accordance with the recording of said downloaded content data to the detachable second storing unit.

14. The apparatus according to claim 9, wherein when said second storing unit cannot be used when the reception start request to download the content data is communicated to said server, the controlling unit is configured to only store said downloaded content data into said first storing unit without queuing the downloaded content data for subsequent transfer to said second storing unit.

15. A receiving method of a receiving apparatus for downloading content data from a server through a network, comprising:

determining whether a storing medium, used by a detachable second storing unit is of a built-in type, in which the storing medium is built into the detachable second storing unit, or of a detachable type, in which the storing medium can be loaded into, and removed from, the detachable second storing unit;

determining whether the storing medium has been loaded into the detachable second storing unit, when the detachable second storing unit is determined to use the storing medium of the detachable type;

determining, by the receiving apparatus, whether downloaded content data is to be stored in the detachable first storing unit, based on whether the detachable first storing unit can be used when a reception start request to download the content data is communicated to said server and, when the storing medium is determined to be of the detachable type, based on the determination of whether the storing medium of the detachable type has been loaded;

automatically storing, by the receiving apparatus, the downloaded content data into a second storing unit of the receiving apparatus which is fixedly used, when the determining whether downloaded content data is to be stored step determines that the downloaded content data is not to be stored in the detachable first storing unit; and automatically storing, by the receiving apparatus, the downloaded content data into the second storing unit of the receiving apparatus which is fixedly used and automatically recording the downloaded content data into the detachable first storing unit, when the determining whether downloaded content data is to be stored step determines that the downloaded content data is to be stored in the detachable first storing unit, wherein the determining whether downloaded content data is to be stored step, and one of the automatically storing step or the automatically storing and automatically recording step, are performed for each reception start request communicated by the communicating unit of the receiving apparatus.

16. A receiving program for allowing a computer apparatus to execute a receiving method of a receiving apparatus for downloading content data, from a server, through a network, the receiving method comprising:

determining whether a storing medium, used by a detachable second storing unit is of a built-in type, in which the storing medium is built into the detachable second storing unit, or of a detachable type, in which the storing medium can be loaded into, and removed from, the detachable second storing unit;

determining whether the storing medium has been loaded into the detachable second storing unit, when the detachable second storing unit is determined to use the storing medium of the detachable type;

determining, by the receiving apparatus, whether downloaded content data is to be stored in the detachable first storing unit, based on whether the detachable first storing unit can be used when a reception start request to download the content data is communicated to said server and, when the storing medium is determined to be of the detachable type, based on the determination of whether the storing medium of the detachable type has been loaded;

automatically storing, by the receiving apparatus, the downloaded content data into a second storing unit of the receiving apparatus which is fixedly used, when the determining whether downloaded content data is to be stored step determines that the downloaded content data is not to be stored in the detachable first storing unit; and automatically storing, by the receiving apparatus, the downloaded content data into the second storing unit of the receiving apparatus which is fixedly used and automatically recording the downloaded content data into the detachable first storing unit, when the determining whether downloaded content data is to be stored step determines that the downloaded content data is to be stored in the detachable first storing unit, wherein the determining whether downloaded content data is to be stored step, and one of the automatically storing step or the automatically storing and automatically recording step, are performed for each reception start request communicated by the communicating unit of the receiving apparatus.

17. A non-transitory computer-readable storage medium having embedded therein instructions, which when executed by a processor, cause the processor to perform a receiving method of a receiving apparatus for downloading content data from a server through a network, the receiving method comprising:

determining whether a storing medium, used by a detachable second storing unit is of a built-in type, in which the storing medium is built into the detachable second storing unit, or of a detachable type, in which the storing medium can be loaded into, and removed from, the detachable second storing unit;

determining whether the storing medium has been loaded into the detachable second storing unit, when the detachable second storing unit is determined to use the storing medium of the detachable type;

determining, by the receiving apparatus, whether downloaded content data is to be stored in the detachable first storing unit, based on whether the detachable first storing unit can be used when a reception start request to download the content data is communicated to said server and, when the storing medium is determined to be of the detachable type, based on the determination of whether the storing medium of the detachable type has been loaded;

automatically storing, by the receiving apparatus, the downloaded content data into a second storing unit of the receiving apparatus which is fixedly used, when the determining whether downloaded content data is to be stored step determines that the downloaded content data is not to be stored in the detachable first storing unit; and automatically storing, by the receiving apparatus, the downloaded content data into the second storing unit of the receiving apparatus which is fixedly used and automatically recording the downloaded content data into the detachable first storing unit, when the determining whether downloaded content data is to be stored step determines that the downloaded content data is to be stored in the detachable first storing unit, wherein the determining whether downloaded content data is to be stored step, and one of the automatically storing step or the automatically storing and automatically recording step, are performed for each reception start request communicated by the communicating unit of the receiving apparatus.

18. The apparatus according to claim 1, wherein the communicating unit is configured to communicate the reception start request to download the content data in response to a content data request inputted by a user of the receiving apparatus.

19. The apparatus according to claim 1, wherein the recording apparatus is a portable device that is further configured to play back the downloaded content data.

* * * * *